United States Patent
Kane et al.

(10) Patent No.: US 12,292,316 B2
(45) Date of Patent: May 6, 2025

(54) SENSOR APPARATUS

(71) Applicant: Altria Client Services LLC, Richmond, VA (US)

(72) Inventors: David B. Kane, Richmond, VA (US); Yezdi B. Pithawalla, Richmond, VA (US); Srinivasan Janardhan, Glen Allen, VA (US); Gerd Kobal, Sandy Hook, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/602,737

(22) Filed: Mar. 12, 2024

(65) Prior Publication Data

US 2024/0219213 A1  Jul. 4, 2024

Related U.S. Application Data

(63) Continuation of application No. 18/189,346, filed on Mar. 24, 2023, now Pat. No. 11,953,354, which is a
(Continued)

(51) Int. Cl.
*G01F 1/42* (2006.01)
*A24C 5/34* (2006.01)
(Continued)

(52) U.S. Cl.
CPC .............. *G01F 1/42* (2013.01); *A24C 5/3406* (2013.01); *A24F 40/485* (2020.01); *A24F 40/51* (2020.01);
(Continued)

(58) Field of Classification Search
CPC ... G01F 1/42; G01F 1/34; G01F 1/363; A24C 5/3406; A24F 40/485; A24F 40/51;
(Continued)

(56) References Cited

U.S. PATENT DOCUMENTS 5,220,830 A  6/1993  Bonne
5,269,327 A  12/1993  Counts et al.
(Continued)

FOREIGN PATENT DOCUMENTS

CN  103492873 A  1/2014
CN  106687034 A  5/2017
(Continued)

OTHER PUBLICATIONS

International Search Report and Written Opinion thereof dated Mar. 28, 2019 for corresponding International Application No. PCT/EP2018/085607.
(Continued)

*Primary Examiner* — Eric S. McCall
*Assistant Examiner* — Anthony W Megna Fuentes
(74) *Attorney, Agent, or Firm* — Harness, Dickey & Pierce, P.L.C.

(57) ABSTRACT

A sensor apparatus may include a channel structure configured to couple with an external element and a fluid conduit, such that the channel structure may receive a fluid, at least partially drawn through the external element from an ambient environment, and direct the fluid through the fluid conduit. A sensor may generate sensor data indicating a flow rate of the fluid through the fluid conduit based on monitoring a variation in a pressure at a location in hydrodynamic contact with the fluid conduit and in relation to an ambient pressure of the ambient environment. The sensor apparatus may enable generation of improved topography information associated with flows of fluid drawn from the external element based on measuring a local pressure at the location in hydrodynamic contact with the fluid conduit and determining the ambient pressure based on monitoring the local pressure over time.

16 Claims, 11 Drawing Sheets

Related U.S. Application Data continuation of application No. 17/329,539, filed on May 25, 2021, now Pat. No. 11,629,981, which is a continuation of application No. 15/858,287, filed on Dec. 29, 2017, now Pat. No. 11,035,704.

(51) Int. Cl.
| | |
|---|---|
| *A24F 40/485* | (2020.01) |
| *A24F 40/51* | (2020.01) |
| *A24F 40/65* | (2020.01) |
| *A24F 40/80* | (2020.01) |
| *G01F 1/34* | (2006.01) |
| *G01F 1/36* | (2006.01) |
| *H05B 3/44* | (2006.01) |
| *A24F 40/10* | (2020.01) |

(52) U.S. Cl.
CPC .............. *A24F 40/65* (2020.01); *A24F 40/80* (2020.01); *G01F 1/34* (2013.01); *G01F 1/363* (2013.01); *H05B 3/44* (2013.01); *A24F 40/10* (2020.01)

(58) Field of Classification Search
CPC .......... A24F 40/65; A24F 40/80; A24F 40/10; H05B 3/44
See application file for complete search history.

(56) References Cited

U.S. PATENT DOCUMENTS

| | | |
|---|---|---|
| 7,726,320 B2 | 6/2010 | Robinson et al. |
| 8,746,240 B2 | 6/2014 | Terry et al. |
| 8,910,640 B2 | 12/2014 | Sears et al. |
| 9,282,772 B2 | 3/2016 | Tucker et al. |
| 9,635,886 B2 | 5/2017 | Tu |
| 2013/0192623 A1 | 8/2013 | Tucker et al. |
| 2014/0014126 A1 | 1/2014 | Peleg et al. |
| 2015/0027457 A1 | 1/2015 | Janardhan et al. |
| 2016/0128389 A1 | 5/2016 | Lamb et al. |
| 2016/0143361 A1 | 5/2016 | Juster et al. |
| 2016/0331025 A1 | 11/2016 | Cameron |
| 2016/0331035 A1 | 11/2016 | Cameron |
| 2016/0356751 A1 | 12/2016 | Blackley |
| 2016/0363917 A1 | 12/2016 | Blackley |
| 2016/0366939 A1 | 12/2016 | Alarcon et al. |
| 2017/0020197 A1 | 1/2017 | Cameron |
| 2017/0027229 A1 | 2/2017 | Cameron |
| 2017/0046357 A1 | 2/2017 | Cameron |
| 2017/0048929 A1 | 2/2017 | Murison et al. |
| 2017/0127722 A1 | 5/2017 | Davis et al. |
| 2017/0135410 A1 | 5/2017 | Cameron |
| 2017/0182267 A1 | 6/2017 | Cameron |
| 2017/0360094 A1 | 12/2017 | Kuczaj |

FOREIGN PATENT DOCUMENTS

| | | | | |
|---|---|---|---|---|
| DE | 102011110061 A1 | * | 2/2013 | ............... G01F 1/34 |
| EP | 0713078 A1 | | 5/1996 | |
| FR | 2238917 A1 | | 2/1975 | |
| JP | 2004-532045 A | | 10/2004 | |
| WO | WO-02/098245 A1 | | 12/2002 | |
| WO | WO-2013116565 A1 | | 8/2013 | |
| WO | WO-2015/107552 A1 | | 7/2015 | |
| WO | WO-2016079533 A1 | * | 5/2016 | ........... A24C 5/3406 |
| WO | WO-2016/096482 A1 | | 6/2016 | |
| WO | WO-2016/175320 A1 | | 11/2016 | |

OTHER PUBLICATIONS

Written Opinion of the International Preliminary Examining Authority dated Nov. 22, 2019 for corresponding International Application No. PCT/EP2018/085607.
Ip.com NPL Query search.
Ip.com Patent PGPub search.
Ip.com Patent Query search.
Cunningham, Anthony, et al. "Development, validation and application of a device to measure e-cigarette users' puffing topography." Scientific reports 6 (2016).
No Known Author. "My Firefly 2 Vaporizer Review." Superb Flavor (Sep. 8, 2017). Vapecritic.com.
Russian Office Action and Search Report dated Mar. 5, 2022 for corresponding Russian Application No. 2020121836, and English-language translations thereof.
Russian Notice of Allowance dated May 18, 2022 for corresponding Russian Application No. 2020121836, and English-language translation thereof.
Japanese Office Action dated Jan. 10, 2023 for corresponding Japanese Application No. 2020-533791, and English-language translation thereof.
Japanese Decision to Grant a Patent dated Jun. 6, 2023 for corresponding Japanese Application No. 2020-533791, and English-language translation thereof.
Brazilian Office Action dated May 23, 2023 for corresponding Brazilian Application No. 112020012547-4, and English-language translation thereof.
Chinese Office Action and Search Report dated Sep. 13, 2023 for corresponding Chinese Application No. 201880078752.6, and English-language translation thereof.
Korean Office Action dated Nov. 16, 2023 for corresponding Korean Application No. 10-2020-7020302, and English-language translation thereof.
Korean Notice of Allowance dated Jul. 23, 2024 for corresponding Korean Application No. 10-2020-7020302, and English-language translation thereof.

* cited by examiner

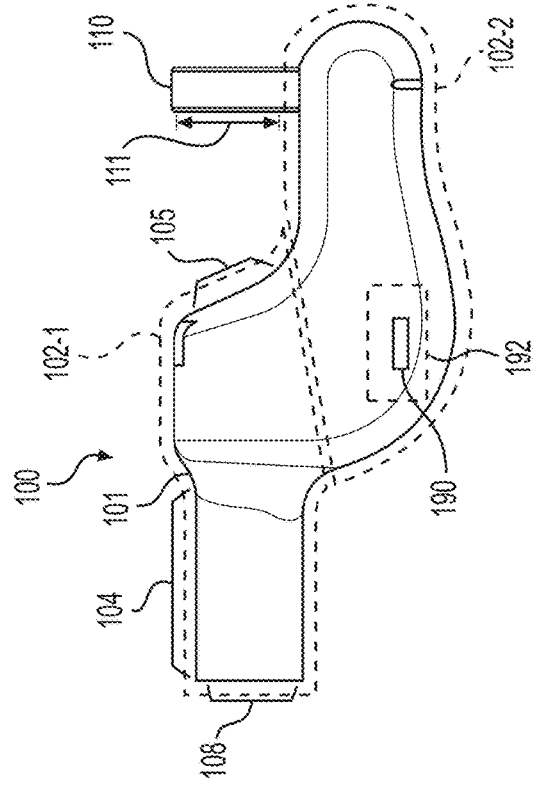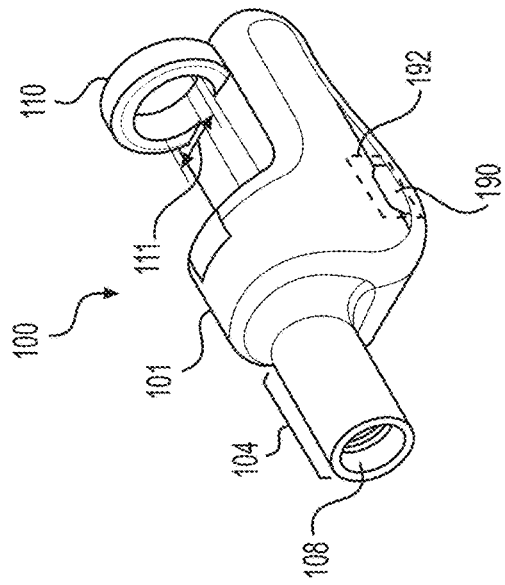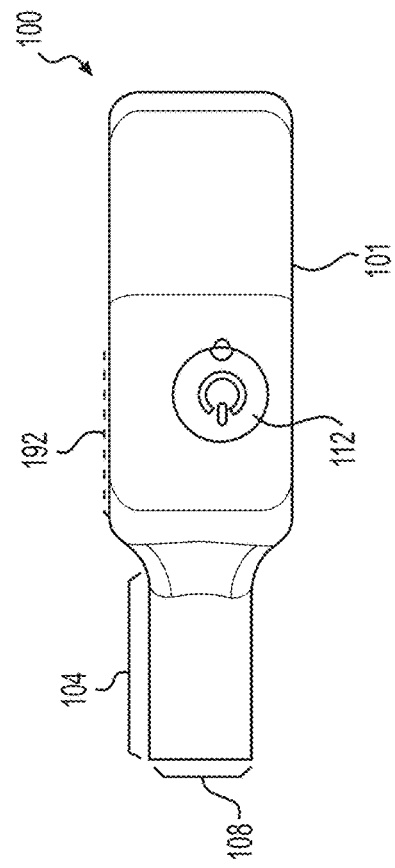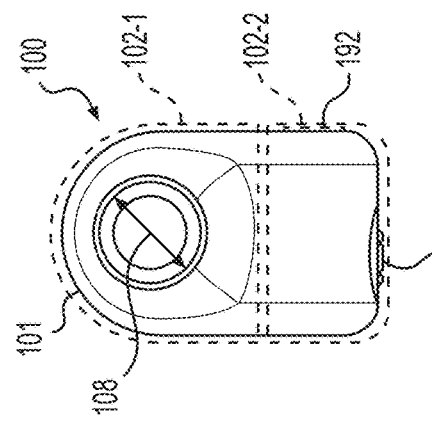

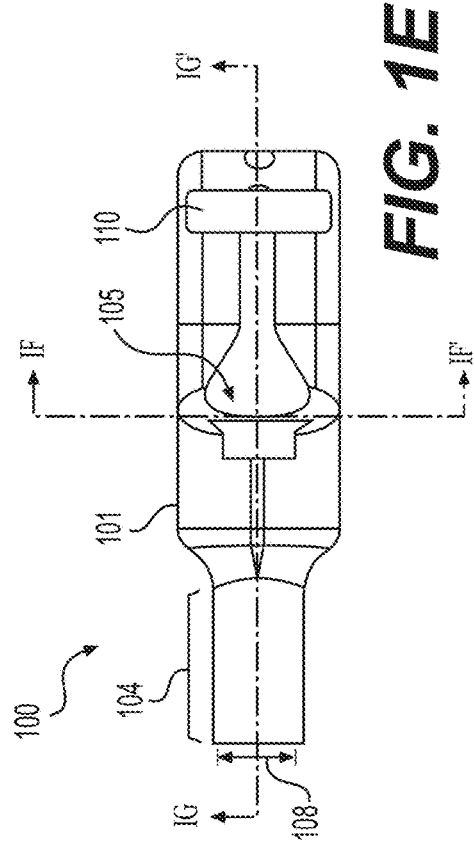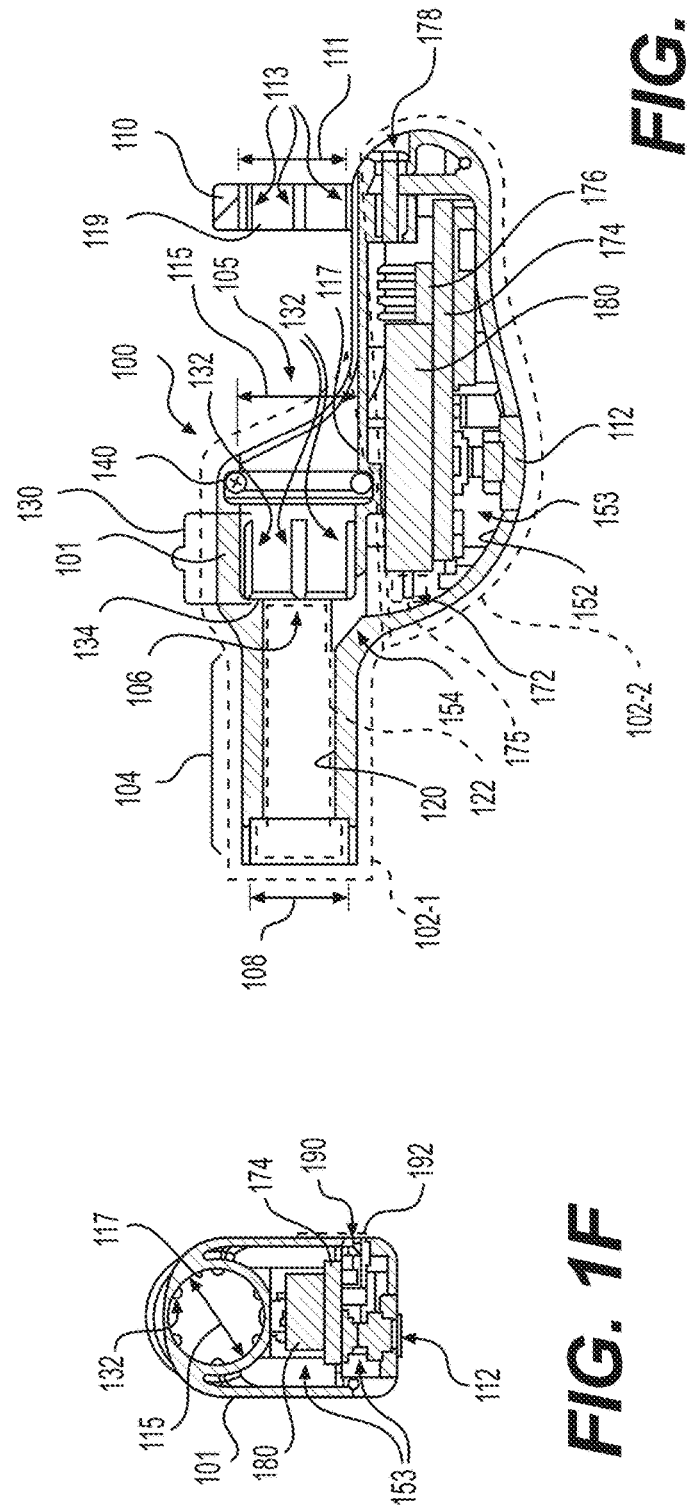

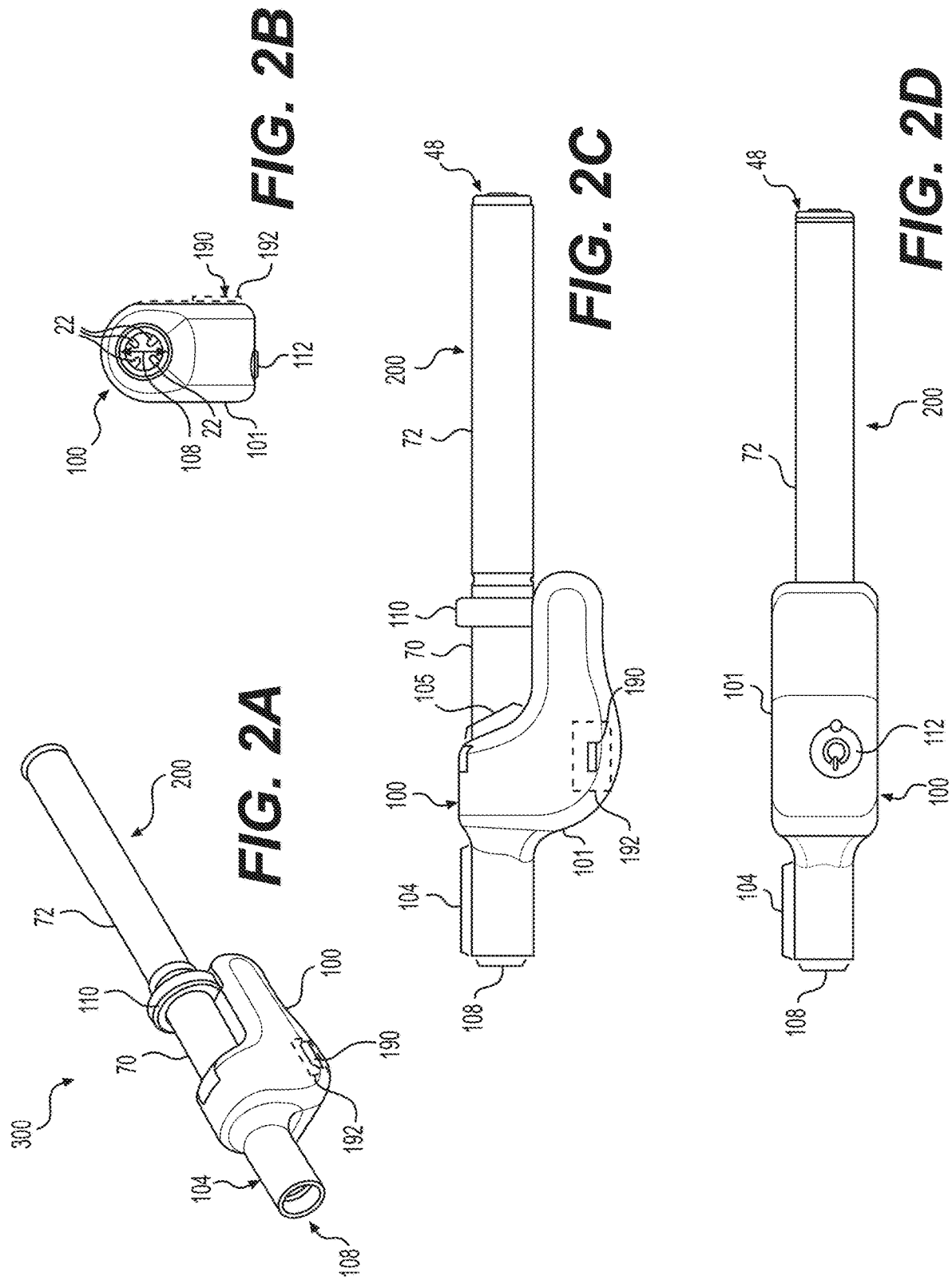

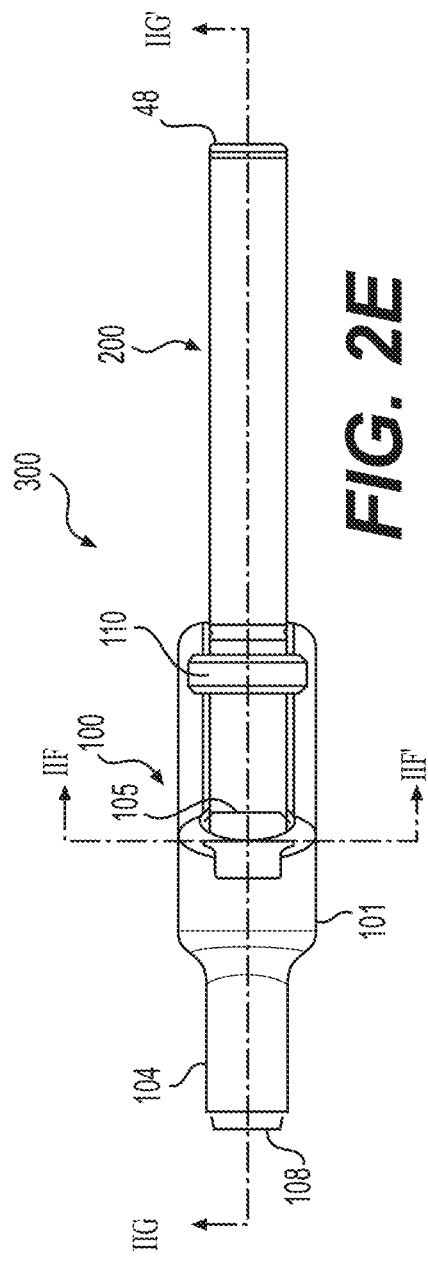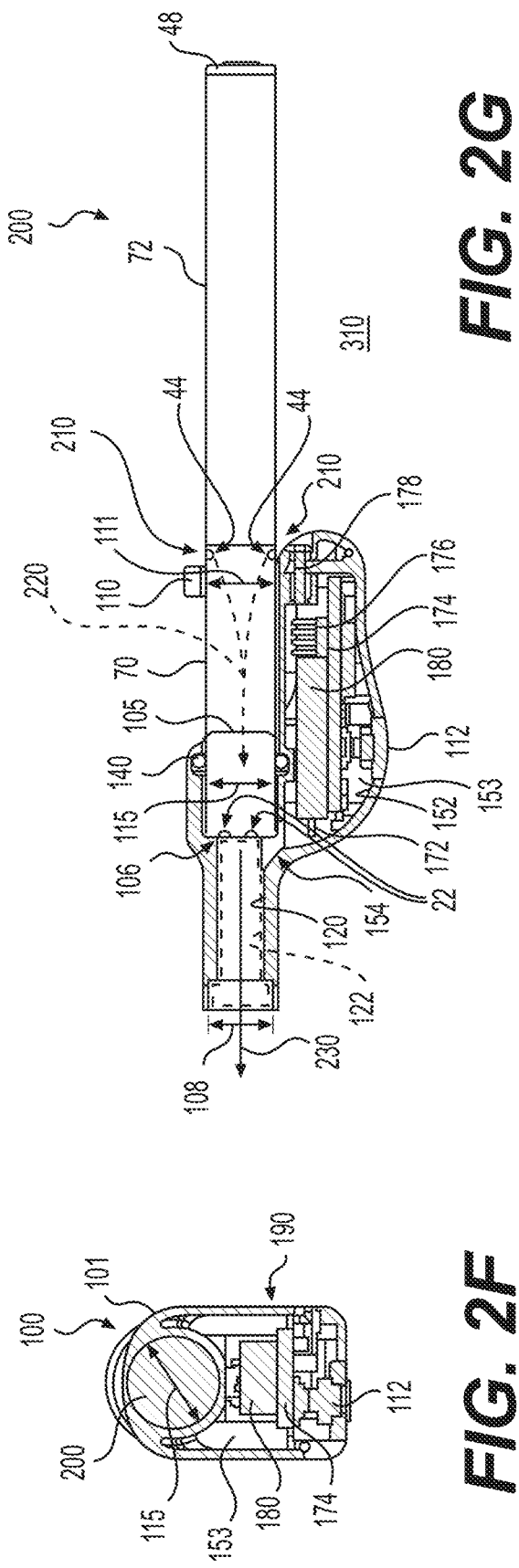

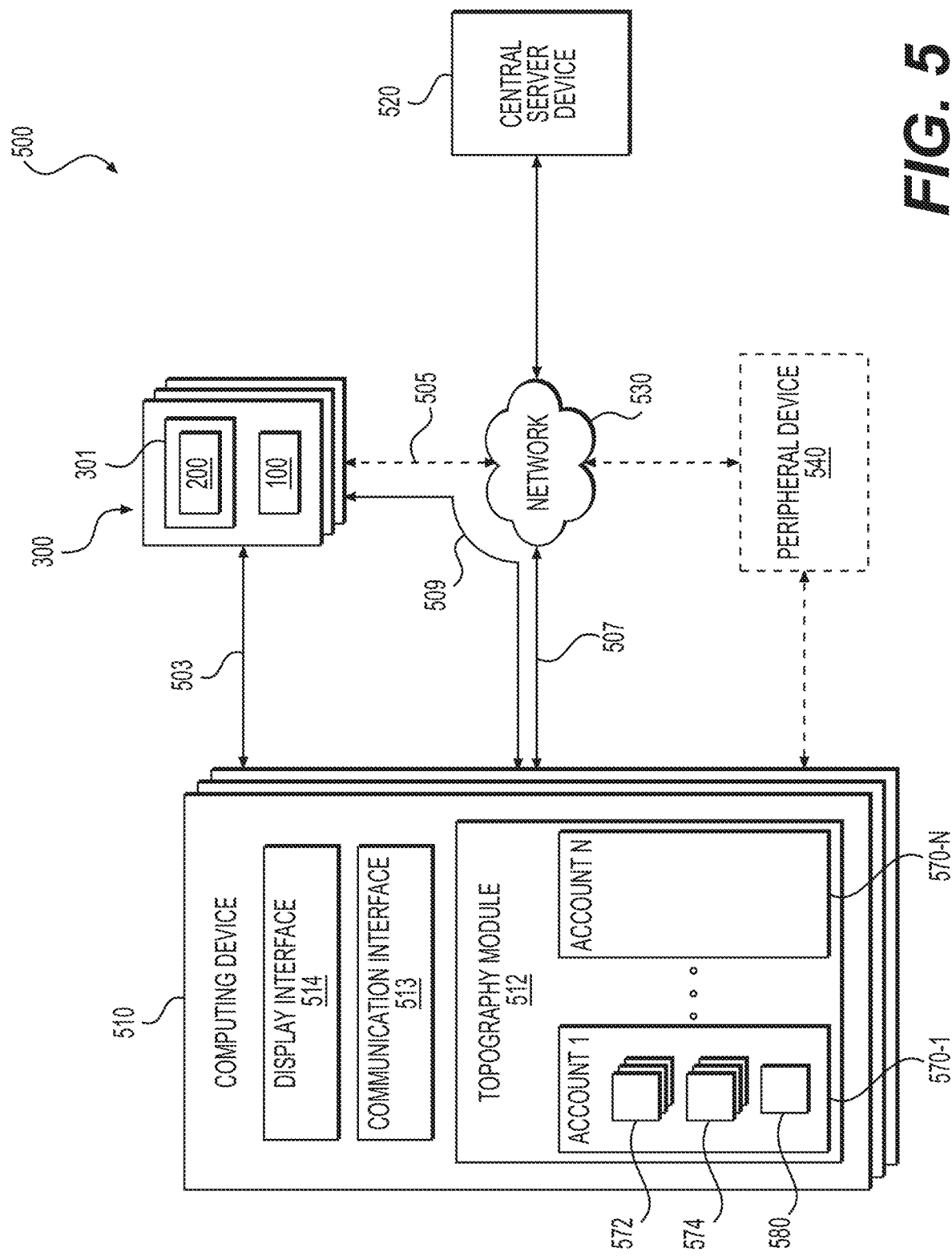

SENSOR APPARATUS

CROSS-REFERENCE TO RELATED APPLICATIONS

The present application is a continuation of U.S. application Ser. No. 18/189,346, filed on Mar. 24, 2023, which is a continuation of U.S. application Ser. No. 17/329,539, filed on May 25, 2021, which is a continuation of U.S. application Ser. No. 15/858,287, filed on Dec. 29, 2017, the entire contents of each of which are incorporated herein by reference.

BACKGROUND

Field

The present disclosure relates generally to sensor apparatuses and more particularly to sensor apparatuses configured to determine a flow rate of a fluid through an element based on monitoring a variation in pressure of the fluid based on the fluid passing through the element from an ambient environment.

Description of Related Art

In some cases, sensor apparatuses are used to monitor a flow of a fluid through an element. In some cases, such an element may include an electronic vaping device (also referred to interchangeably herein as an "e-vaping device").

In some cases, sensor apparatuses include a calibrated orifice. Such sensor apparatuses may measure a flow rate of a fluid passing through an element based on monitoring a variation in fluid pressure across the calibrated orifice. For example, some sensor apparatuses include an orifice plate in a fluid conduit. An orifice plate may include a hole through which fluid may pass to flow through the fluid conduit. A sensor apparatus may determine the flow rate of the fluid through the fluid conduit based on measuring a difference in fluid pressure between locations upstream and downstream of the orifice plate. Such a determination may include applying the measured pressure difference to Bernoulli's Equation. Such a measuring may include measuring a pressure of the fluid at both an upstream location of the fluid conduit in relation to the orifice plate and a downstream location of the fluid conduit in relation to the orifice plate.

SUMMARY

According to some example embodiments, a sensor apparatus may include a channel structure and a sensor. The channel structure may include an inlet, an outlet, and an inner surface defining a fluid conduit extending from the inlet to the outlet through an interior of the channel structure. The channel structure may be configured to couple with an external element, such that the channel structure is configured to receive a fluid drawn through the external element at the inlet, the fluid at least partially drawn through the external element from an ambient environment, and direct the fluid through the fluid conduit. The sensor may be in hydrodynamic contact with the fluid conduit. The sensor may be configured to generate sensor data indicating a flow rate of the fluid through the fluid conduit based on monitoring a variation in a pressure at a location in hydrodynamic contact with the fluid conduit and in relation to an ambient pressure of the ambient environment.

The external element may be an e-vaping device configured to generate a vapor and direct the vapor through an outlet end of the e-vaping device. The inlet may include an interface configured to couple with the outlet end of the e-vaping device, such that the interface establishes a substantially airtight seal between the inlet of the channel structure and the outlet end of the e-vaping device, the channel structure is configured to receive the vapor at the inlet and direct the vapor through the fluid conduit to the outlet, and the sensor apparatus is configured to determine a flow rate of the vapor based on monitoring the variation in the pressure at the location and a pressure drop at the inlet of the channel structure that is induced based on air being drawn through the e-vaping device to the inlet of the channel structure from the ambient environment.

The interface is configured to detachably couple with the outlet end of the e-vaping device.

The channel structure may be configured to induce a pressure drop, through the fluid conduit, that is substantially negligible in relation to the pressure drop at the inlet of the channel structure that is induced based on air being drawn through the e-vaping device.

The sensor apparatus may include a wireless network communication transceiver, such that the sensor apparatus is configured to communicate the sensor data to a separately-located device via a wireless network communication link.

The sensor apparatus may be further configured to communicate a sensor data stream providing a real-time indication of the flow rate of the fluid through the fluid conduit.

The sensor apparatus may be configured to determine that an instance of fluid is passing through the channel structure, based on monitoring the variation in the pressure at the location over a period of time.

The sensor apparatus may be configured to determine a volume and/or mass of the instance of fluid based on monitoring the variation in the pressure at the location over the period of time.

The sensor may be incorporated into the inner surface defining the fluid conduit, such that a fluid conduit-proximate surface of the sensor is substantially coplanar with the inner surface.

The sensor apparatus may further include an orifice structure in the fluid conduit, and a plurality of sensor devices, at least two sensor devices of the plurality of sensor devices in hydrodynamic contact with the fluid conduit that at opposite sides of the orifice structure.

According to some example embodiments, an assembly may include a cartridge configured to generate a vapor and a sensor apparatus. The cartridge may include a pre-vapor formulation reservoir configured to hold a pre-vapor formulation, a vaporizer assembly configured to heat the pre-vapor formulation to generate the vapor, and an outlet structure defining an outlet conduit. The outlet structure may be configured to direct the vapor out of the cartridge via the outlet conduit based on air being drawn through the cartridge to the outlet conduit from an ambient environment. The sensor apparatus may be coupled to the outlet structure of the cartridge. The sensor apparatus may be configured to monitor a flow rate of the generated vapor out of the cartridge. The sensor apparatus may include a channel structure including an inlet, an outlet, and an inner surface defining a fluid conduit extending from the inlet to the outlet through an interior of the channel structure. The channel structure may be configured to receive the vapor directed out of the cartridge and direct the vapor through the fluid conduit to the outlet. The sensor apparatus may include a sensor in hydrodynamic contact with the fluid conduit. The sensor may be configured to generate sensor data indicating a flow rate of the vapor through the fluid conduit based on monitoring a variation in a pressure at a location in hydrodynamic contact with the fluid conduit and in relation to an ambient pressure of the ambient environment.

The sensor apparatus may be configured to be detachably coupled to the cartridge.

The sensor apparatus may be configured to establish a substantially airtight seal between the inlet of the channel structure and the cartridge.

The channel structure is configured to induce a pressure drop, through the fluid conduit, that is substantially negligible in relation to the pressure drop at the inlet of the channel structure that is induced based on air being drawn through the cartridge.

The sensor apparatus may include a wireless network communication transceiver, such that the sensor is configured to communicate the sensor data to a separately-located device via a wireless network communication link.

The sensor apparatus may be further configured to communicate a sensor data stream providing a real-time indication of the flow rate of the vapor through the fluid conduit.

The sensor apparatus may be configured to determine that an instance of fluid is passing through the channel structure, based on monitoring the variation in the pressure at the location over a period of time.

The sensor apparatus may be configured to determine a volume and/or mass of the instance of fluid based on monitoring the variation in the pressure at the location over the period of time.

The sensor may be incorporated into the inner surface defining the fluid conduit, such that a fluid conduit-proximate surface of the sensor is substantially coplanar with the inner surface.

The sensor apparatus may further include an orifice structure in the fluid conduit; and a plurality of sensor devices, at least two sensor devices of the plurality of sensor devices in hydrodynamic contact with the fluid conduit that at opposite sides of the orifice structure.

According to some example embodiments, a system may include an e-vaping device configured to generate a vapor and direct the vapor out of an outlet of the e-vaping device based on air being drawn through the e-vaping device to the outlet from an ambient environment. The system may include a sensor apparatus configured to couple with the outlet of the e-vaping device and generate a sensor data stream providing a real-time indication of a flow rate of the vapor out of the e-vaping device. The sensor apparatus may include a channel structure including an inlet, an outlet, and an inner surface defining a fluid conduit extending from the inlet to the outlet through an interior of the channel structure. The channel structure may be configured to receive the vapor directed out of the e-vaping device and direct the vapor through the fluid conduit to the outlet. The sensor apparatus may include a sensor in hydrodynamic contact with the fluid conduit, the sensor configured to generate sensor data indicating a flow rate of the vapor through the fluid conduit based on monitoring a variation in a pressure at a location in hydrodynamic contact with the fluid conduit and in relation to an ambient pressure of the ambient environment. The system may include a computing device communicatively linked to the sensor apparatus via a wireless network communication link, wherein the sensor apparatus is configured to communicate the sensor data stream to the computing device via the wireless network communication link, and wherein the computing device is further configured to process the sensor data to generate topography information associated with at least one of the sensor apparatus and the e-vaping device.

The sensor apparatus may be configured to be detachably coupled to the e-vaping device.

The sensor apparatus may be configured to establish a substantially airtight seal between the inlet of the channel structure and the e-vaping device.

The channel structure may be configured to induce a pressure drop, through the fluid conduit, that is substantially negligible in relation to the pressure drop at the inlet of the channel structure that is induced based on air being drawn through the e-vaping device.

The sensor apparatus may be configured to determine that an instance of fluid is passing through the channel structure, based on monitoring the variation in the pressure at the location over a period of time.

The sensor apparatus may be configured to determine a volume and/or mass of the instance of fluid based on monitoring the variation in the pressure at the location over the period of time.

The sensor may be incorporated into the inner surface defining the fluid conduit, such that a fluid conduit-proximate surface of the sensor is substantially coplanar with the inner surface.

The sensor apparatus may further include an orifice structure in the fluid conduit, and a plurality of sensor devices, at least two sensor devices of the plurality of sensor devices in hydrodynamic contact with the fluid conduit that at opposite sides of the orifice structure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A is a perspective view of a sensor apparatus according to some example embodiments.

FIG. 1B is a side view of the sensor apparatus of FIG. 1A according to some example embodiments.

FIG. 1C is a front view of the sensor apparatus of FIG. 1A according to some example embodiments.

FIG. 1D is a bottom view of the sensor apparatus of FIG. 1A according to some example embodiments.

FIG. 1E is a top view of the sensor apparatus of FIG. 1A according to some example embodiments.

FIG. 1F is a cross-sectional view along line IF-IF' of the sensor apparatus of FIG. 1E.

FIG. 1G is a cross-sectional view along line IG-IG' of the sensor apparatus of FIG. 1E.

FIG. 2A is a perspective view of an assembly that includes a sensor apparatus and an e-vaping device according to some example embodiments.

FIG. 2B is a front view of the assembly of FIG. 2A according to some example embodiments.

FIG. 2C is a side view of the assembly of FIG. 2A according to some example embodiments.

FIG. 2D is a bottom view of the assembly of FIG. 2A according to some example embodiments.

FIG. 2E is a top view of the assembly of FIG. 2A according to some example embodiments.

FIG. 2F is a cross-sectional view along line IIF-IIF' of the assembly of FIG. 2E.

FIG. 2G is a cross-sectional view along line IIG-IIG' of the assembly of FIG. 2E.

FIG. 5 is a schematic of a system configured to enable display and/or communication of topography information at one or more devices based on sensor data generated at one or more sensor apparatuses according to some example embodiments.

DETAILED DESCRIPTION OF EXAMPLE EMBODIMENTS

Figure 2H:
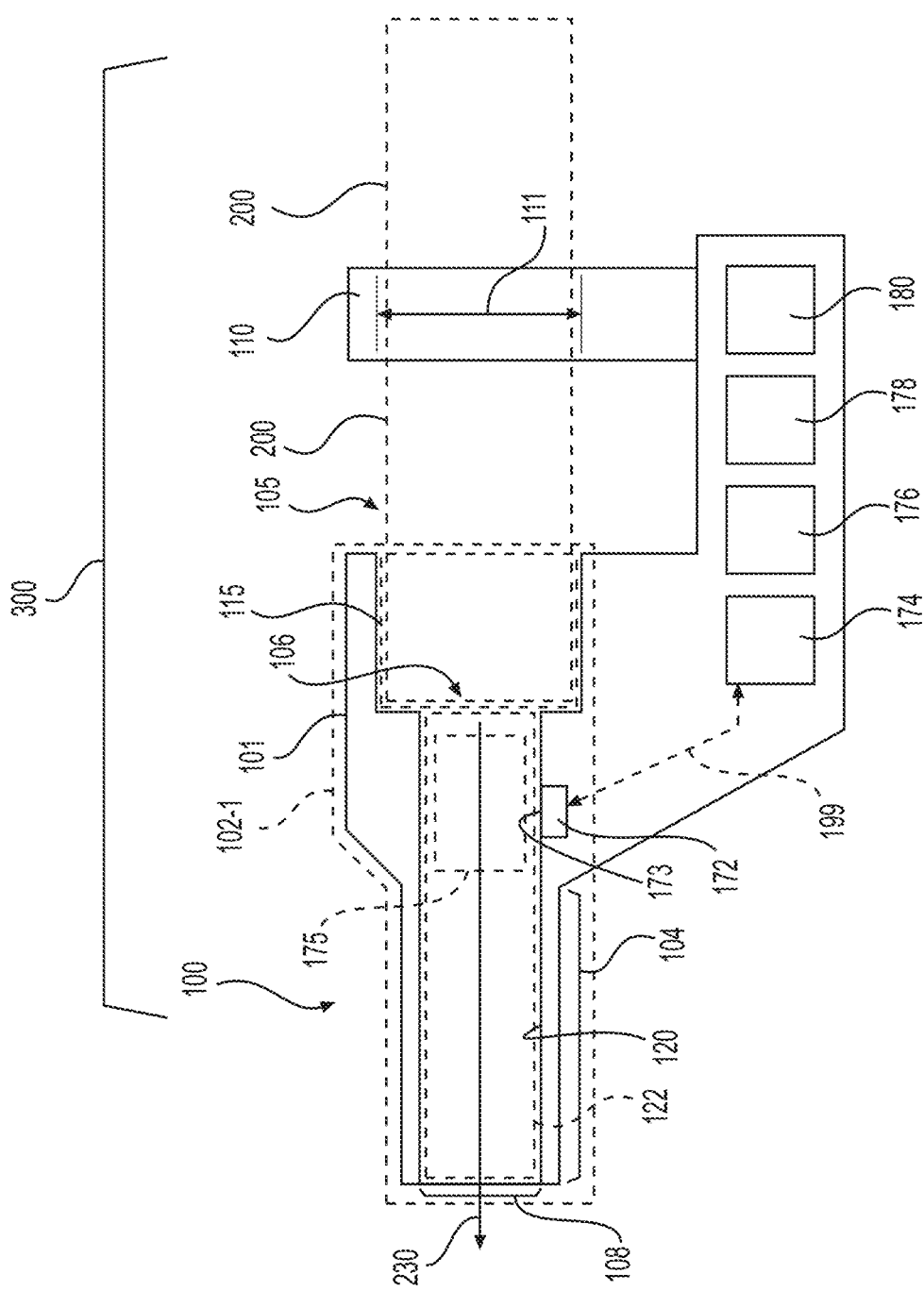
FIG. 2H is a cross-sectional view of an assembly according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only some example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a perspective view of a sensor apparatus according to some example embodiments. FIG. 1B is a side view of the sensor apparatus of FIG. 1A according to some example embodiments. FIG. 1C is a front view of the sensor apparatus of FIG. 1A according to some example embodiments. FIG. 1D is a bottom view of the sensor apparatus of FIG. 1A according to some example embodiments. FIG. 1E is a top view of the sensor apparatus of FIG. 1A according to some example embodiments. FIG. 1F is a cross-sectional view along line IF-IF' of the sensor apparatus of FIG. 1E. FIG. 1G is a cross-sectional view along line IG-IG' of the sensor apparatus of FIG. 1E.

Referring first in general to FIGS. 1A-1G, a sensor apparatus 100 is shown that is configured to direct a fluid through a fluid conduit thereof and is further configured to generate sensor data indicating a flow rate of the fluid through the fluid conduit based on monitoring a variation in a pressure at a location in hydrodynamic contact with the fluid conduit and in relation to an ambient pressure of the ambient environment.

As described further below, the sensor apparatus 100 may provide a relatively compact structure that is configured to generate data ("information") providing a relatively high-accuracy, real-time or near-real-time data indication of a flow rate and/or amount of fluid drawn through the sensor apparatus 100 (e.g., from an external element coupled thereto) based on determining a pressure differential between the ambient pressure (e.g., a pressure at an inlet of the external element) and a pressure at the outlet of the sensor apparatus 100 via data generated by a single, individual sensor device that is at a location in hydrodynamic contact with a fluid conduit of the sensor apparatus 100 through which fluid is drawn. As described further below, the sensor apparatus 100 is configured to determine the pressure differential, which may also be utilized to determine the flow rate of the flow flowing through the fluid conduit, based on estimating the ambient pressure. The sensor apparatus 100 may determine the ambient pressure based on monitoring the pressure in the location in hydrodynamic contact with the fluid conduit during conditions that are associated with reduced and/or negligible fluid flow through the fluid conduit. Because a coupled external element may be associated with an inherent resistance to draw ("RTD") of fluid flow there through, the sensor apparatus 100 may leverage the inherent ("latent") RTD of a coupled external element to determine the ambient pressure based on negligible and/or minimal fluid flow from the external element and to further generate data indicating the fluid flow rate from the external element based on monitoring the pressure in the fluid conduit during a draw of fluid from the external element and comparing the monitored pressure with the determined ambient pressure.

Because the sensor apparatus 100 utilizes a single ("individual") sensor device, the sensor apparatus 100 may have a relatively compact structure. Additionally, the sensor apparatus 100 may include the sensor device in a location wherein the sensor device does not partially or fully obstruct the diameter of the fluid conduit, which may further result in the fluid conduit presenting a reduced and/or minimized influence upon the flow rate of fluid drawn through the coupled external element, relative to the flow of fluid drawn through the coupled external element if and/or when the sensor apparatus 100 is not coupled to the external element. Restated, the fluid conduit does not include a restricted diameter that would limit the maximum flow rate of fluid through the fluid conduit to be less than the maximum flow rate of fluid that may be drawn out of the external element in the absence of a sensor apparatus 100 being coupled to the external element.

Furthermore, the sensor apparatus 100 may include a wireless communication interface that may communicate information generated by the sensor apparatus 100 (e.g., sensor data, pressure differential information, flow rate information, fluid volume and/or mass information, etc.) in real-time and/or near-real-time in relation to the generation of data by the sensor device of the sensor apparatus 100.

Because the sensor apparatus 100 utilizes only a single, individual sensor device, thereby enabling the sensor apparatus 100 to have a relatively compact structure, and/or because the sensor device is in hydrodynamic communication with the fluid conduit and thus is not at least partially obstructing the fluid conduit, the structure of the sensor apparatus 100 may enable monitoring of fluid draws from the external element while reducing and/or minimizing any effects ("influences") of the sensor apparatus itself 100 upon the parameters ("characteristics") of the fluid draws, for example by not limiting the maximum flow rate of fluid through the fluid conduit to be less than the maximum flow rate of fluid that may be drawn out of the external element in the absence of a sensor apparatus 100 being coupled to the external element. The wireless communication interface may further enable reduced influence of the sensor apparatus 100 upon fluid draws from the external element, the wireless communication interface enables the omission of a wired communication link between the sensor apparatus (and thus the coupled external element) and an external computing device that is used to collect and/or process information provided by the sensor apparatus.

By enabling omission of the wired communication link, the sensor apparatus 100 and coupled external element (referred to herein as an "assembly") may be manipulated and/or operated with reduced physical and/or operational limitations and/or restrictions. The relatively compact structure of the sensor apparatus 100 and reduced influence of the sensor apparatus 100 upon the fluid flow from the external element may further enable manipulation and/or operation of the sensor apparatus and/or coupled external element with reduced physical and/or operational limitations and/or restrictions.

As a result, the sensor data generated by the sensor apparatus 100 with regard to fluid drawn from the external element and through the sensor apparatus 100 may provide a more accurate and reliable indication of the parameters ("characteristics") of fluid drawn from the external element when the external element is not coupled to the sensor apparatus 100. Such characteristics of fluid drawn through the external element may include patterns of fluid draws from the external element. Such patterns, and information associated therewith, are referred to herein as "topography information."

As described further below, the data generated by the sensor apparatus 100 may be utilized to generate topography information that indicates one or more patterns of fluid draws through one or more external elements coupled to the sensor apparatus 100. Because, as noted above, the sensor apparatus 100 is configured to provide a more accurate and reliable indication of the parameters ("characteristics") of fluid drawn from the external element when the external element is not coupled to the sensor apparatus 100, the sensor apparatus 100 enables the generation and monitoring of topography information that provides a more accurate and reliable indication of the patterns of draws of fluid from the external element even when the external element is not coupled to the sensor apparatus 100.

A "fluid" as described herein may include a substance that does not have a fixed shape and is configured to continuously deform ("flow") under an applied shear stress. A fluid may include a substance that is a liquid (e.g., is in a liquid "phase," liquid "state," etc.), a substance that is gas (e.g., is in a gas "phase," gas "state,"), a substance that is a mixture, solution, emulsion, suspension, and/or colloid of one or more separate substances that may be in common or different phases ("states,"), some combination thereof, or the like. Where a fluid includes a mixture, one or more substances of the mixture may be a dissolved or dispersed phase of the mixture, and one or more substances of the mixture may be a dispersion medium ("mixture phase") of the mixture. The dissolved or dispersed phase and the mixture phase of a fluid that is a mixture may have common or different phases.

For example, a fluid may be a liquid and/or an emulsion of different liquid phase substances. In another example, a fluid may be a gas and/or gas mixture of different gas phase substances ("elements," molecular compounds, etc.), including "air" as the term is commonly understood. In another example, a fluid may be a mixture of a liquid phase substance in a gas phase substance (e.g., solution, colloid, and/or suspension). In another example, a fluid may include a vapor that is a suspension of liquid substance in a gas phase substance and that is generated in an external element coupled to the sensor apparatus 100, such a vapor being referred to herein as a "generated vapor." In another example, a fluid may include a mixture of the aforementioned generated vapor and an external fluid (e.g., "air") that is drawn through the external element to the sensor apparatus, wherein the fluid may include vapor that is drawn by the external fluid from the external element and through the sensor apparatus 100.

As referred to herein, a "flow rate" of a fluid may include a mass flow rate of the fluid, a volumetric flow rate of the fluid, some combination thereof, or the like.

Still referring to FIGS. 1A-1G, the sensor apparatus 100 includes a housing 101. The housing 101 includes multiple portions that at least partially define separate portions of the sensor apparatus 100. As shown in FIGS. 1A-1E, the housing 101 defines both a channel structure 102-1 and a sensor structure 102-2, each described further below.

Referring first to the channel structure 102-1, the housing 101 defines an inlet 105 at one end of the sensor structure 102-2 and further includes an outlet portion 104 that defines an outlet 108 at the opposite end of the sensor structure 102-2.

As shown in FIGS. 1E-1G, the channel structure 102-1 includes one or more inner surfaces 117 defining a coupling space 115 that extends from inlet 105 to a separate opening 106 (opening 106 may also be referred to interchangeably herein as an "inlet"). As described further below, the coupling space 115 is configured to receive and couple with an external element (e.g., an e-vaping device) via inlet 105, such that a fluid may be drawn from the external element into the opening 106.

As shown in FIGS. 1E-1G, the channel structure 102-1 includes an inner surface 120 that defines a fluid conduit 122. As shown in at least FIG. 1G, the fluid conduit 122 extends from opening 106 to the outlet 108 through an interior of the channel structure 102-1. As further shown in FIG. 1G, the diameter of the fluid conduit 122 may be variable, as the inner diameter of the channel structure 102-1 that at least partially defines the fluid conduit 122 may be greater at a location proximate to the outlet 108 than at a location proximate to the opening 106.

Referring now generally to FIGS. 1A-1G, the sensor apparatus 100 may be configured to couple with an external element at the channel structure 102-1, such that one or more outlets of the external element are in fluid communication with the opening 106 and a fluid may pass (e.g., may be drawn) from the one or more outlets of the external element and through the fluid conduit 122 via the opening 106. The sensor apparatus 100 may thus be configured to generate sensor data indicating a flow rate of the fluid that is drawn through the fluid conduit 122, thereby generating sensor data indicating a flow rate of the fluid that is drawn out of the one or more outlets of the external element.

As shown in FIGS. 1F-1G, the channel structure 102-1 may include an interface 130 that is configured to couple with the external element so that one or more outlets of the external element are positioned in fluid communication with the opening 106 of the fluid conduit 122. The interface 130 may be configured to detachably couple with an outlet end of the external element (e.g., an e-vaping device 200 as illustrated in FIGS. 2A-2H below). The interface 130 includes the aforementioned coupling space 115 that is defined by an inner surface 117 of the channel structure 102-1, where the coupling space 115 has a diameter that corresponds, within manufacturing tolerances and/or material tolerances, to an outer diameter of the external element.

As further shown in FIGS. 1F-1G, the interface 130 includes coupling elements 132 that extend in parallel with a longitudinal axis of the coupling space 115. The coupling elements 132 project from the inner surface 117 and into the coupling space 115, such that the coupling elements 132 are configured to engage with an outer surface of an external element that is inserted into the coupling space 115 via inlet 105. As shown and described further below with reference to FIGS. 2A-2G, based on engaging with the outer surface of the external element, the coupling elements 132 may establish a friction fit between the external element and the channel structure 102-1, thereby holding the external element in place such that an outlet of the external element is adjacent to, and in fluid communication with the opening 106.

As further shown in FIG. 1G, and as further shown in at least FIG. 2G, the channel structure 102-1 may include a gasket 140 that is configured to engage with an outer surface of an external element inserted into the coupling space 115. The gasket 140 may be configured to establish a substantially airtight seal between the gasket 140 and the outer surface of the external element as a result of such engagement, where a "substantially" airtight seal is referred to as a seal that is airtight within manufacturing tolerances and/or material tolerances associated with the gasket 140, the channel structure 102-1, and/or the external element with which that gasket 140 engages.

Still referring to FIGS. 1F-1G, the sensor apparatus 100 may include a guide structure 110 that is configured to hold an external element that is coupled with interface 130 in a particular position, such that the external element is positioned in alignment with the longitudinal axis of the interface 130 and further is positioned in alignment with the opening 106 and fluid conduit 122.

As shown, the guide structure 110 includes an inner surface 119 that defines a gap space 111 in the interior of the guide structure 110, where the gap space has a diameter that is at least corresponding to the outer diameter of the external element. The diameter of the gap space 111 may, in some example embodiments, match the diameter of the coupling space 115. The guide structure 110 further includes coupling elements 113 extending along the inner surface 119. Coupling element 113 is configured, similarly to the coupling elements 132, to engage with an outer surface of an external element that is inserted into the gap space 111.

As shown in FIG. 2G, based on engaging with the outer surface of the external element, the coupling elements 113 may establish a friction fit between the external element and the guide structure 110, thereby holding the external element in place. The guide structure 110 is configured to accommodate the external element through the gap space 111, such that the external element extends through the gap space 111 and through the coupling space 115 to the interface 130, furthermore such that the external element is held in fluid communication, at one or more outlets thereof, with the opening 106 of the channel structure 102-1.

In some example embodiments, the guide structure 110 is configured to transfer a structural load of the sensor apparatus 100 to the external element that is inserted through the guide structure 110 and the coupling space 115 to be coupled to interface 130. As a result, the sensor apparatus 100 may be structurally supported by the external element via at least the guide structure 110. The sensor apparatus 100 may, in some example embodiments, be structurally supported by the external element via at least the interface 130.

As shown in FIGS. 1A-2G, the guide structure 110 may have a substantially circular ring shape, such that the guide structure 110 is configured to receive and physically engage an external element having a circular cylindrical or substantially circular cylindrical shape so that the guide structure 110 may be configured to transfer a structural load of the sensor apparatus 100 to the engaged external element, where "substantially circular" will be understood to mean "circular within manufacturing tolerances and/or material tolerances." It will be understood that in some example embodiments the guide structure 110 may have any shape of ring (e.g., triangular, rectangular, etc.) such that the guide structure 110 may be configured to receive and physically engage an external element having any shape (e.g., triangular prism, rectangular prism, etc.).

Still referring to FIGS. 1F-1G, the sensor apparatus 100 includes a sensor structure 102-2 that is at least partially defined by a corresponding portion of the housing 101. In particular, as shown in at least FIGS. 1F-1G, a portion of the housing 101 is a sensor structure 102-2 that includes an inner surface 152 that defines a cavity space 153 within an interior of the sensor structure 102-2.

As shown in FIGS. 1F-1G, in some example embodiments, the sensor apparatus 100 includes a sensor device 172, a processor 174 (also referred to herein as "processing circuitry"), a memory 176 (also referred to herein as a "storage device"), a communication interface 178, and a power supply 180.

The sensor apparatus 100 further may include an initialization interface 112 ("power switch") that is configured to selectively initialize the sensor apparatus 100 (e.g., enable or disable the supply of electrical power from power supply 180 to one or more elements of the sensor apparatus 100) based on adult vaper interaction with the initialization interface 112. The sensor apparatus 100 may further include a power interface 190 that is configured to enable electrical power to be supplied to the power supply 180 based on a wired conduit (e.g., a Universal Serial Bus cable) coupling with the power interface 190 and supplying the electrical power to the power supply 180 via the power interface 190. In some example embodiments, the power interface 190 includes a communication interface, such that information may be communicated between the sensor apparatus 100 and an external device ("separately-located device") via the power interface 190 and a wired conduit coupled thereto. For example, the power interface 190 may be a USB interface configured to communicate information and electrical power between the sensor apparatus 100 and an external device.

The sensor apparatus 100 may further include an interface cover 192 that is configured to cover the power interface 190 and to obscure the power interface 190 from external exposure when a wired conduit is not coupled to the power interface 190. As illustrated in the figures, interface cover 192 may have a rectangular shape. However, it will be understood that the interface cover 192 may have any shape, including a polygonal shape, a circular shape, an ellipsoid shape, a curved shape, an ovoid shape, some combination thereof, or the like. In some example embodiments, interface cover 192 is absent from sensor apparatus 100.

In some example embodiments shown in at least FIGS. 1F-1G, the sensor device 172, processor 174, memory 176, communication interface 178, and power supply 180 are all located at least partially within the sensor structure 102-2. However, as shown and described below with reference to FIG. 2H, one or more of the aforementioned elements may be located at least partially external to the sensor structure 102-2 (e.g., at least partially within the channel structure 102-1).

The sensor device 172 is configured to measure a pressure of fluid at a location 175 that is proximate to the sensor device 172. Restated, the sensor device 172 is configured to measure a "local" fluid pressure. The sensor device 172 may be one or more of a pressure sensor, a microelectromechanical system (MEMS) sensor, etc.

In some example embodiments, the sensor apparatus 100 is configured to enable the location 175 that is proximate to the sensor device 172 to be in hydrodynamic contact with the fluid conduit 122, such that the sensor device 172 is configured to measure a pressure at a location 175 that is in hydrodynamic contact with the fluid conduit 122.

For example, as shown in FIG. 1G, the housing 101 may define a conduit 154 that extends between the fluid conduit 122 and the cavity space 153, such that at least a portion of the cavity space 153, which is proximate to the sensor device 172 and is separate from the fluid conduit 122, is in hydrodynamic contact with at least at a portion of the fluid conduit 122 that is proximate to the interface between the conduit 154 and the fluid conduit 122.

Because the sensor device 172 is configured to measure a pressure at a location 175 in hydrodynamic contact with the fluid conduit 122, the sensor device 172 is itself in hydrodynamic contact with the fluid conduit 122 and thus is configured to measure a pressure of a fluid in and/or passing through the fluid conduit 122.

Still referring to FIGS. 1F-1G, the sensor apparatus 100 may be configured to communicate information to an external, remotely-located device via the communication interface 178. The communication interface 178 may be any wired or wireless network communication device. For example, the communication interface 178 may be a wireless network communication transceiver (e.g., BLUETOOTH® transceiver). The sensor apparatus 100 may communicate, via communication interface 178, one or more instances of information. The information may be sensor data generated by the sensor device 172, processed sensor data generated by the sensor device 172 and processed by the processor 174, fluid conduit pressure differential data generated by the processor 174 and/or sensor device 172, fluid conduit flow rate data generated by the processor 174 and/or sensor device 172, some combination thereof, or the like. In some example embodiments, the communication interface 178 may communicate, via a communication link to an external device, a sensor data stream providing a real-time or near-real-time indication of at least one of a flow rate of a fluid (e.g., a mixture of generated vapor and external fluid) out of the external element, a pressure differential, a total to-date amount of fluid drawn through the flow conduit during a fluid draw, some combination thereof, or the like.

FIG. 2A is a perspective view of an assembly that includes a sensor apparatus and an e-vaping device according to some example embodiments. FIG. 2B is a front view of the assembly of FIG. 2A according to some example embodiments. FIG. 2C is a side view of the assembly of FIG. 2A according to some example embodiments. FIG. 2D is a bottom view of the assembly of FIG. 2A according to some example embodiments. FIG. 2E is a top view of the assembly of FIG. 2A according to some example embodiments. FIG. 2F is a cross-sectional view along line IIF-IIF' of the assembly of FIG. 2E. FIG. 2G is a cross-sectional view along line IIG-IIG' of the assembly of FIG. 2E.

As shown in FIGS. 2A-2G, the sensor apparatus 100 may couple with an external element that is an e-vaping device 200 to establish an assembly 300. The e-vaping device 200, described further below with reference to FIGS. 4A-4B, may be configured to generate a vapor and direct the vapor out of one or more outlets of the e-vaping device 200.

As further described below with reference to FIGS. 4A-4B, the e-vaping device 200 may include one or more inlets and one or more outlets, such that the e-vaping device 200 is configured to enable an external fluid (e.g., air) to be drawn through the e-vaping device 200, from an ambient environment and further from the one or more inlets of the e-vaping device to the one or more outlets of the e-vaping device. Vapor generated at the e-vaping device 200 may be drawn through the one or more outlets with at least some of the external fluid drawn from the ambient environment. As noted above, the mixture of external fluid and generated vapor that is drawn from the e-vaping device 200 via one or more outlets thereof may be referred to herein as simply a "fluid" that is drawn through the external element (e-vaping device 200), at least partially from the ambient environment.

As shown in FIGS. 2A-2G, the e-vaping device 200 may include one or more inlets 44 and one or more outlets 22. The one or more outlets 22 of the e-vaping device 200 may be in fluid communication with the one or more inlets 44 through an interior of at least a portion of the e-vaping device 200, such that an external fluid (e.g., air and/or vapor) may be drawn through the interior of the e-vaping device 200, from ambient environment 310 via one or more inlets 44, and through one or more outlets 22 to an exterior of the e-vaping device 200, alone or in combination with a vapor generated within the interior of the e-vaping device 200.

As referred to herein, the e-vaping device 200 may have a "tip-end" and an "outlet end," wherein the "outlet end" of the e-vaping device 200 is distinguished by the presence of one or more outlets 22 therein, and the "tip end" of the e-vaping device 200 is distal from the outlet end.

As shown in FIGS. 2A-2G, the e-vaping device 200 may be coupled with the sensor apparatus 100 based on the outlet end of the e-vaping device 200 being inserted through the gap space 111 of the guide structure 110 and further into the coupling space 115 of the channel structure 102-1, via the inlet 105, such that the outlet end of the e-vaping device 200 is coupled with interface 130 and the one or more outlets 22 at the outlet end are positioned directly adjacent to, and in direct fluid communication with, the opening 106 of the fluid conduit 122.

As a result, because the e-vaping device 200 is configured to enable an external fluid to be drawn through one or more inlets 44 from the ambient environment 310, through the interior of the e-vaping device 200, and through one or more outlets 22, coupling the e-vaping device 200 to the sensor apparatus 100 may configure the channel structure 102-1 of the sensor apparatus 100 to receive a fluid drawn at least partially through the e-vaping device 200 from the ambient environment 310 and from the e-vaping device 200 at the opening 106, wherein the fluid is at least partially drawn through the e-vaping device 200 from an ambient environment 310. The channel structure 102-1 may further direct the fluid through the fluid conduit 122, and the fluid may be directed out of the sensor apparatus 100 via outlet 108.

As shown in FIG. 2G, the interface 130 may be configured to couple with the outlet end of the e-vaping device 200 such that the gasket 140 engages with an outer housing of the e-vaping device 200. The gasket 140 may establish an airtight or substantially airtight seal between the channel structure 102-1 and the e-vaping device 200, where "substantially airtight" is understood to mean "airtight within manufacturing tolerances and/or material tolerances," such that the flow of a fluid out of the one or more outlets 22 and back through inlet 105 through the coupling space 115, external to the e-vaping device 200, is inhibited or substantially inhibited (e.g., inhibited within manufacturing tolerances and/or material tolerances).

FIG. 2H is a cross-sectional view of an assembly 300 according to some example embodiments.

In some example embodiments, including some example embodiments shown in FIG. 2H, a sensor apparatus 100 includes a sensor device 172 that is located in the channel structure 102-1 such that a fluid conduit-proximate surface 173 of the sensor device 172 is flush ("coplanar") or substantially flush ("substantially coplanar") (e.g., flush within manufacturing tolerances and/or material tolerances) with an inner surface 120 of the channel structure 102-1 that at least partially defines the fluid conduit 122. Surface 173 may be understood to be coplanar or substantially coplanar with the inner surface 120. The surface 173 and inner surface 120 thus collectively at least partially define the fluid conduit 122.

As further shown in FIG. 2H, because the sensor device 172 is incorporated into the channel structure 102-1 so that surface 173 at least partially defines the fluid conduit 122 while being coplanar or substantially coplanar with other surfaces (e.g., inner surface 120) that at least partially define the fluid conduit 122, the sensor device 172 is configured to directly measure a local pressure in at least a particular location 175 of the fluid conduit 122, where the location 175 is a region within at least a particular proximity to the sensor device 172. Because the fluid conduit-proximate surface 173 of the sensor device 172 is coplanar or substantially coplanar with inner surface 120, the effects of the sensor device 172 upon the flow of fluid through the fluid conduit 122 (e.g., obstructions to flow), and thus the effects of the sensor device 172 upon the draw of vapor through the fluid conduit 122, are reduced and/or minimized.

As further shown in FIG. 2H, the sensor device 172 may be communicatively coupled to the processor 174, memory 176, communication interface 178, and power supply 180 of the sensor apparatus 100 via one or more communication lines 199 (e.g., a conductive wire).

Referring generally to FIGS. 1A-2H, and with particular reference to elements shown specifically in FIG. 1G and FIG. 2G, an external fluid 210 (e.g., air) may be drawn into an interior of the e-vaping device 200 from an ambient environment 310 via one or more inlets 44 of the e-vaping device 200. As described further below, the e-vaping device 200 may generate a vapor based on the external fluid 210 being drawn into the interior of the e-vaping device 200 and through the interior of the e-vaping device 200 to one or more of the outlets 22. The external fluid 210 drawn into the interior of the e-vaping device 200, as shown in FIG. 2G, may mix with the generated vapor in the interior of the e-vaping device 200 to establish a mixture referred to herein as fluid 220. Fluid 220 may be drawn through the interior of the e-vaping device 200 to one or more outlets 22 of the e-vaping device 200. In some example embodiments, and as described further below with reference to FIGS. 4A-4B, the fluid 220 may include, in addition to external fluid drawn into the interior via the one or more inlets 44 (e.g., air), the vapor generated within the interior of the e-vaping device 200.

Returning to FIGS. 1A-2H in general and FIG. 2G in particular, the fluid 220 drawn through the interior of the e-vaping device 200 to the one or more outlets 22 may be drawn through the one or more outlets 22 and into the fluid conduit 122 of the channel structure 102-1 via opening 106 as fluid 230. Fluid 230 may be directed by the channel structure 102-1 to flow through the fluid conduit 122 and through the outlet 108 of the channel structure 102-1.

In some example embodiments, the e-vaping device 200 may be associated with an inherent ("latent") resistance to draw (RTD) of fluid through the e-vaping device from the ambient environment, through one or more inlets 44, through the interior of the e-vaping device 200, and through one or more outlets 22 to exit the e-vaping device. As a result, the pressure of a fluid 220 drawn through the e-vaping device 200 from the ambient environment 310 may fall from the ambient pressure of the ambient environment 310 as the fluid 220 passes through the interior of the e-vaping device 200. The magnitude of the pressure drop of the fluid being drawn through the interior of the e-vaping device 200 may be proportional to the rate at which the fluid is drawn through the interior of the e-vaping device 200. As a result, the pressure of fluid 230 drawn out of the e-vaping device 200 via one or more outlets 22 may be less than the pressure of external fluid 210 drawn into the e-vaping device 200 via the one or more outlets 22.

In contrast, the channel structure 102-1 may be configured to induce a pressure drop, through the fluid conduit 122, that is substantially negligible in relation to the pressure drop of fluid 220 drawn through an interior of external element (e.g., e-vaping device 200) from the ambient environment 310 to the outlets 22.

Therefore, in some example embodiments, the measured pressure of a fluid in the fluid conduit 122 may be less than the ambient pressure of external fluid 210 in the ambient environment 310, based on the inherent RTD of the e-vaping device 200 through which the fluid is drawn from the ambient environment 310 to the fluid conduit 122. Such a difference in pressure between the pressure of fluid 230 and the pressure of external fluid 210 may be referred to herein as a "pressure differential."

In some example embodiments, the magnitude of the pressure differential is proportional to the flow rate of the fluid 230 from the e-vaping device 200 and through the fluid conduit 122. As a result, if and/or when the flow rate of the fluid 230 through the fluid conduit 122 is negligible, the pressure of fluid 230 in the fluid conduit 122 may be the same or substantially the same (e.g., the same within manufacturing tolerances and/or material tolerances and/or within normal variations of atmospheric pressure in an ambient environment) as the ambient pressure (e.g., the pressure of external fluid 210) in the ambient environment 310.

As indicated above, in some example embodiments, the sensor device 172 is configured to generate sensor data indicating a flow rate of a fluid passing through the fluid conduit 122 based on monitoring the variation in the pressure at a location 175 in hydrodynamic contact with the fluid conduit 122 and in relation to an ambient pressure of the ambient environment.

In some example embodiments, the sensor device 172 is configured to generate such sensor data based on determining a value of the ambient pressure of the ambient environment 310, such that the sensor device 172 is configured to generate sensor data indicating a determined pressure difference ("pressure differential," "$\Delta P$," some combination thereof, or the like) between the measured pressure at the location 175 in hydrodynamic contact with the fluid conduit 122 (the measured pressure at the location 175 at any given time being referred to herein as "P") and a determined value of the ambient pressure (the determined value of the ambient pressure at any given time being referred to herein as the "determined ambient pressure," "$P_0$", some combination thereof, or the like). As referred to herein, "determining" a value may include "calculating" the value (e.g., via applying one or more input values to one or more equations) and/or accessing the value from a look-up table (LUT) (e.g., via applying one or more input values to a look-up table to identify and/or "access" one or more output values associated with the applied one or more input values in the look-up table).

Restated, the sensor device 172, alone or in combination with the processor 174, enables determination of $P_0$ based on monitoring the local pressure measured by the sensor device 172 at location 175 over a period of time (discussed further below). In some example embodiments, the sensor device 172 may determine $\Delta P$ based on measuring P at sensor device 172 and calculating $\Delta P$ as shown by equation (1) below:

$$\Delta P = P - P_0 \qquad (1)$$

Based on the determination of the pressure differential "$\Delta P$" associated with the flow of a fluid through the fluid conduit 122, the flow rate of the fluid 230 through the fluid conduit 122 may be determined. For example, the flow rate may be calculated, in some example embodiments, based on application of the pressure differential "$\Delta P$" to an equation associated with Bernoulli's principle, such as equation (2) below, where "Q" is the volumetric flow rate of a fluid through the fluid conduit 122, "$\varepsilon$" is an expansion coefficient associated with compressible media (e.g., gases), "C" is a discharge coefficient relating an unknown diameter of the fluid flow entering the fluid conduit 122 to the full diameter "d" of the fluid conduit 122, "$\beta$" is a ratio of the known diameter of the fluid conduit 122 over the unknown diameter of the fluid flow entering the fluid conduit 122, and "$\rho_1$" is a density of the fluid in the ambient environment:

$$Q = \frac{c}{\sqrt{1-\beta^4}} \cdot \varepsilon \cdot \frac{\pi}{4} \cdot d^2 \cdot \sqrt{2\rho_1 \Delta P} \qquad (2)$$

Assuming that the values of "C", "$\beta$", "$\varepsilon$", "$\rho_1$", and "d" are constant values, the flow rate Q may be calculated based on the pressure differential "$\Delta P$" and a calculated constant value "K" that is derived from one or more of "C", "$\beta$", "$\varepsilon$", "$\rho_1$", and "d" as shown in equation (3) below:

$$Q = K \cdot \sqrt{\Delta P}, \quad (3)$$

where $$K = \frac{c}{\sqrt{1-\beta^4}} \cdot \varepsilon \cdot \frac{\pi}{4} \cdot d^2 \cdot \sqrt{2\rho_1}$$

In some example embodiments, one or more of the aforementioned constant values may vary according to the local temperature and/or pressure. Accordingly, the value of K at any given time may be calculated and/or estimated based on the calculated value of $P_0$ and/or P at the same time. In some example embodiments, the sensor apparatus 100 may include a temperature sensor configured to measure a local temperature relative to the sensor apparatus 100, and the value of the value of K at any given time may be determined (e.g., calculated and/or identified via use of a look-up table) based on the measured local temperature.

In another example, a flow rate "Q" and/or constant value "K" may be determined based on accessing a look-up-table that includes a set of pressure differential ΔP values and associated fluid flow rate Q values and/or constant K values. The look-up-table may be generated separately via well-known empirical techniques, for example via directing various instances of known flow rates of fluid through the fluid conduit and calculating the corresponding pressure differentials associated with the known flow rates of fluid to calculate fluid flow rate Q values, and/or based on directing various instances of known flow rates of fluid through the fluid conduit with known pressure differentials and at various known temperatures to calculate corresponding constant K values.

It will be understood that, while the above description relates to the determination of a volumetric flow rate Q of the fluid 230 through the fluid conduit 122 based on a determined pressure differential, a mass flow rate M of the fluid 230 through the fluid conduit may be determined via similar methodology (e.g., via use of a look-up table, via application of pressure differential values to one or more well-known algorithms for determining mass flow rate based on further application of known and stored constant values associated with the fluid 230 and/or fluid conduit 122, some combination thereof, or the like).

In some example embodiments, the value of $P_0$ may be determined based on monitoring the values of P measured over a period time and mathematically processing the values of P. For example, the period of time may be a magnitude of 40 seconds, and the processing may include determining an arithmetic mean value of the values of P measured within the preceding 40 seconds.

Because the value of $P_0$ is to correspond with the ambient pressure of the ambient environment 310 external to the sensor apparatus 100, the value of $P_0$ is determined based on processing values of P measured if and/or when a flow of fluid 230 through the fluid conduit 122 is substantially absent (e.g., is less than a threshold minimum flow rate, is "negligible," etc.). If and/or when flows of fluid 230 through the fluid conduit 122 are assumed to be relatively infrequent, relative to the magnitude of time during which a flow of fluid 230 through the fluid conduit 122 is substantially absent, the processing of values of P measured over a period time may include discarding ("omitting") values of P measured over the period of time that have values exceeding a threshold margin associated with the values of P measured over the same period of time. For example, the values of P measured over the period of time may be used to generate a statistical distribution (e.g., frequency distribution, probability density function, probability distribution, normal distribution, etc.) of the values of P measured over the period of time.

The values of P that are determined to exceed one or more thresholds associated with the distribution (e.g., the values of P determined to exceed one or more standard deviations from the median P value in a generated statistical distribution of the values of P measured over a particular period of time) may be discarded ("omitted") as outlier values that may correspond to a non-negligible flow of fluid 230 through the fluid conduit 122 and thus not indicate the true ambient pressure, and the remaining non-discarded P values may be processed (e.g., via calculation of an arithmetic mean, median, some combination thereof, or the like) to determine a value of $P_0$.

Because the sensor apparatus 100 is configured to estimate the ambient pressure $P_0$ without utilizing a second sensor device in addition to sensor device 172 and further without the sensor device 172 at least partially obstructing the fluid conduit 122, the sensor apparatus 100 is configured to determine the flow rate Q of fluid through the fluid conduit 122 without restricting the fluid conduit 122 (e.g., via an orifice plate flow meter, Venturi flow meter, or the like) and via the use of a single pressure sensor that measures pressure at a single location. Consequently, the resulting sensor apparatus 100 has a relatively compact structure, with reduced sensor hardware. Furthermore, the absence of hardware restricting the fluid conduit 122 enables the sensor apparatus 100 to monitor the flow rate of the fluid 230 without affecting and/or limiting the flow rate of the fluid 230 drawn from the external element (e.g., e-vaping device 200) by virtue of the presence of sensor hardware (e.g. orifice plate meters, a fluid conduit 122 with a restricted diameter that would limit the maximum flow rate of fluid 230 through the fluid conduit 122 to be less than the maximum flow rate of fluid 230 that may be drawn out of the e-vaping device 200 in the absence of a sensor apparatus 100 being coupled to the e-vaping device, etc.).

In some example embodiments, the total amount (e.g., mass, volume, etc.) of fluid 230 drawn through fluid conduit 122 within any given period of time may be determined simply via known techniques for determining (e.g., "calculating" and/or identifying via look-up table) total mass and/or volume of a fluid passing through a conduit within a time period based on determined mass flow rate and/or volume flow rate values for the fluid during the same time period. For example, a total mass or volume of fluid 230 drawn through the fluid conduit 122 within a given period of time may be determined based on 1) for each separate determined (mass or volume) flow rate value associated with the period of time, determining a value for the mass or volume of the fluid based on multiplication of the flow rate value with a particular time segment value associated with the respective flow rate value and 2) determining a sum of the determined mass or volume values. In another example, a total mass or volume of fluid 230 drawn through the fluid conduit 122 within a given period of time may be determined based on 1) applying curve fitting and/or regression (using any various type of well-known algorithm, including any polynomial algorithm) to a series of (mass or volume) flow rate values determined at various separate points in time during the period of time to generate an algorithm of flow rate based on time that at least approximates the determined flow rate values and 2) performing mathematical integration of the algorithm over the period of time to determine a total mass or volume value of the fluid 230.

In some example embodiments, the above determinations (e.g., "calculations" and/or identifications via use of one or more look-up tables) may be made by processor 174, based on executing a program of instructions that is stored at memory 176 and further based on sensor data received from the sensor device 172.

As noted above, and with reference to FIGS. 1A-2H, the sensor apparatus 100 may communicate information to an external, remotely-located device via the communication interface 178. The communication interface may be any wired or wireless network communication device. For example, the communication interface 178 may be a wireless transceiver (e.g., BLUETOOTH® transceiver). The sensor apparatus 100 may communicate, via communication interface 178, one or more instances of information. The information may include sensor data generated by the sensor device 172, processed sensor data generated by the sensor device 172 and processed by the processor 174, fluid conduit pressure differential data generated by the processor 174 and/or sensor device 172, fluid conduit flow rate data generated by the processor 174 and/or sensor device 172, fluid mass and/or volume data generated by the processor 174 and/or sensor device 172, some combination thereof, or the like.

Figure 2I:
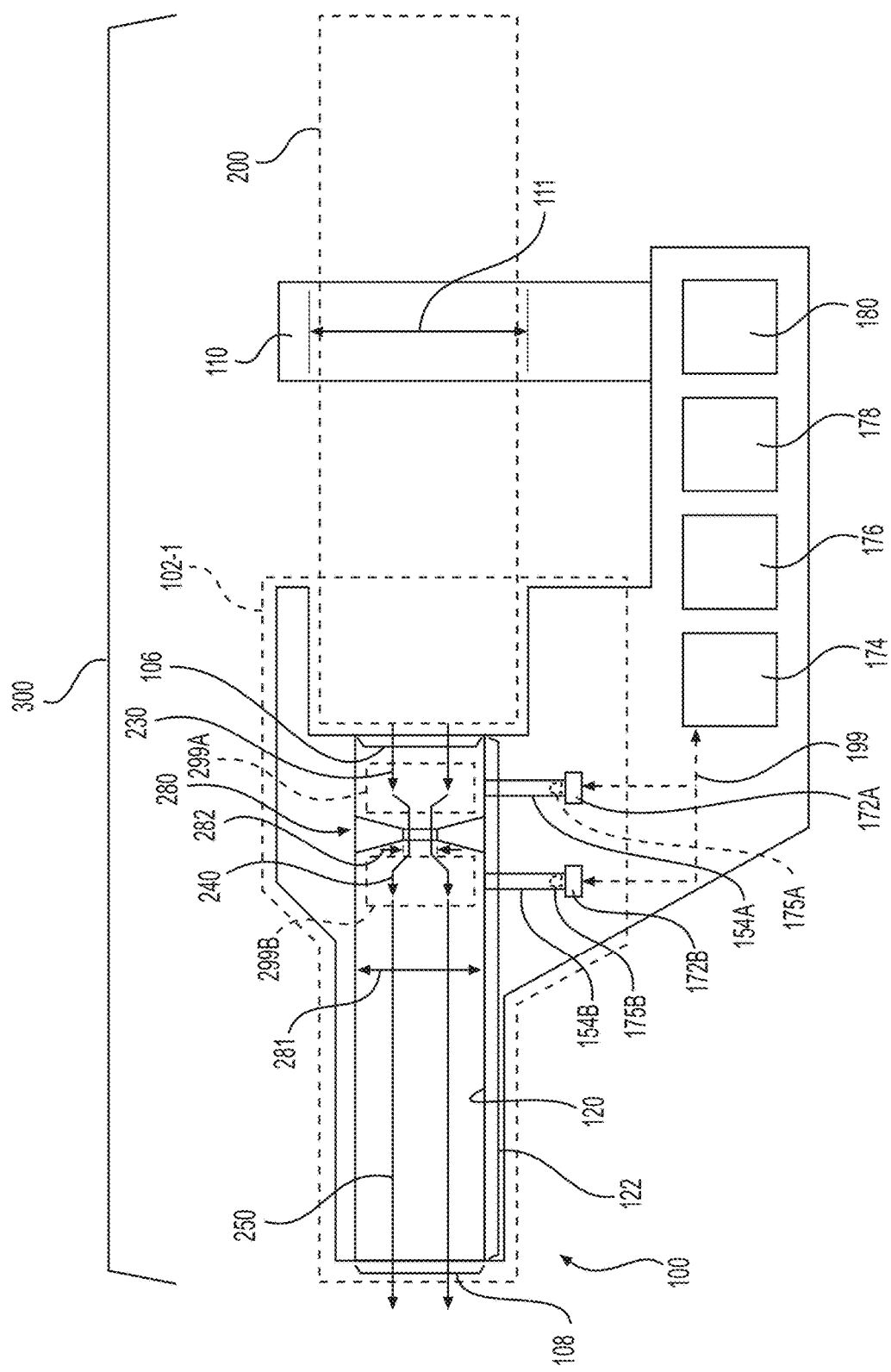
FIG. 2I is a cross-sectional view of an assembly according to some example embodiments.

FIG. 2I is a cross-sectional view of an assembly according to some example embodiments.

While FIGS. 1A-2H are generally described with reference to example embodiments wherein the sensor apparatus 100 of an assembly 300 includes only a single, individual sensor device 172, it will be understood that in some example embodiments, the sensor apparatus 100 may include multiple sensor devices, and the sensor apparatus 100 may be configured to determine pressure differential, fluid flow rate, some combination thereof, or the like based on processing sensor data generated by the multiple sensor devices of the sensor apparatus 100.

For example, in the example embodiments illustrated in FIG. 2I, assembly 300 may include a sensor apparatus 100 having a channel structure 102-1 that includes multiple sensor devices 172A and 172B that are in hydrodynamic contact with separate interior portions 299A and 299B of the fluid conduit 122. As further shown in FIG. 2I, the channel structure 102-1 may include an orifice structure 280 within the fluid conduit 122, where the orifice structure 280 includes at least one orifice 282, such that the channel structure 102-1 is configured to direct fluid drawn through the fluid conduit 122 from the external element 200 to pass through the orifice 282 towards the outlet 108. The orifice 282 has a reduced diameter relative to the diameter 281 of the fluid conduit 122, such that the orifice 282 is configured to at least partially constrict the flow area of the fluid conduit 122. The orifice structure 280 may include any flow orifice or fluid orifice structure that is known in the relevant art, including an orifice plate, a Venturi Nozzle, some combination thereof, or the like.

As shown in FIG. 2I, fluid 230 drawn from the external element 200 and into the fluid conduit 122 at an external-element-proximate end of the fluid conduit 122 may be drawn through internal portion 299A of the fluid conduit 122 (e.g., an inner surface 120 of the fluid conduit 122, the orifice structure 280, and opening 106 may collectively define internal portion 299A as a portion of the fluid conduit 122 that is between the orifice structure 280 and opening 106). As further shown, the channel structure 102-1 may include a first sensor device 172A that is configured to measure a local pressure at a proximate space 175A that is in hydrodynamic contact with internal portion 299A of the fluid conduit 122 via conduit 154A (e.g., the sensor device 172A is in hydrodynamic contact with internal portion 299A via conduit 154A). Thus, sensor device 172A is configured to measure the pressure of fluid 230 at a position in the fluid conduit 122 that is "upstream" of the orifice structure 280.

As shown in FIG. 2I, fluid 230 drawn from the external element may be drawn through the orifice 282 of orifice structure as fluid 240. The fluid 240, upon being drawn through the orifice 282 may be further drawn through a remainder of the fluid conduit (e.g., an "outlet-proximate end" of the fluid conduit 122) as fluid 250.

As shown in FIG. 2I, fluid 250 drawn from the orifice structure 280 and through the outlet-proximate end of the fluid conduit 122 may be drawn through internal portion 299B of the fluid conduit 122 (e.g., an inner surface 120 of the fluid conduit 122, the orifice structure 280, and outlet 108 may collectively define internal portion 299B as a portion of the fluid conduit 122 that is between the orifice structure 280 and outlet 108). As further shown, the channel structure 102-1 may include a second sensor device 172B that is configured to measure a local pressure at a proximate space 175B that is in hydrodynamic contact with internal portion 299B of the fluid conduit 122 via conduit 154B (e.g., the sensor device 172B is in hydrodynamic contact with internal portion 299B via conduit 154B). Thus, sensor device 172B is configured to measure the pressure of fluid 250 at a position in the fluid conduit 122 that is "downstream" of the orifice structure 280.

Thus, as shown in FIG. 2I, a sensor apparatus 100 may include an orifice structure 280 in the fluid conduit 122, and a plurality of sensor devices 172A-172B, at least two sensor devices of the plurality of sensor devices 172A-172B in hydrodynamic contact with the fluid conduit 122 at opposite sides of the orifice structure 280 (e.g., internal portions 299A and 299B, respectively).

While FIG. 2I shows sensor devices 172A-172B that are separated from fluid conduit 122 by conduits 154A-B, it will be understood that, in some example embodiments, one of more of the sensor devices 172A-B may be located in the channel structure 102-1 such that a fluid conduit-proximate surface of the sensor device is flush ("coplanar") or substantially flush ("substantially coplanar") (e.g., flush within manufacturing tolerances and/or material tolerances) with an inner surface 120 of the channel structure 102-1 that at least partially defines the fluid conduit 122.

Each of the first and second sensor devices 172A and 172B may generate sensor data based on their respective pressure measurements. Said pressure measurements may be communicated to processor 174 via one or more communication lines 199. The processor 174 may determine a flow rate of fluid (230, 240, 250) drawn through the fluid conduit based on processing the sensor data from the sensor devices 172A, 172B. It will be understood that the flow rate (mass flow rate and/or volume flow rate) of fluid drawn through the fluid conduit 122 via orifice 282 may be calculated, using the sensor data from sensor devices 172A and 172B that provide measured fluid pressures corresponding to the pressure of fluid 230 in internal portion 299A and the pressure of fluid 250 in internal portion 299B, respectively, using well-known techniques for calculating fluid flow rates using pressure measurements on opposite sides of an orifice structure. It will be understood that the well-known algorithms for calculating fluid flow in a conduit based on measured fluid pressures on opposite sides of an orifice structure are sufficiently well-known so as to be omitted herein.

In some example embodiments, a sensor apparatus 100 that includes multiple sensor devices may be configured to provide a relatively compact structure. Additionally, because the sensor apparatus 100 may utilize a communication interface 178 to communicate information associated with draw records (described further below), the sensor apparatus 100 may enable the generation, monitoring, and/or analysis of improved-accuracy topography information that provide an improved indication of fluid draw properties that correspond to fluid draws through the external element (e.g., e-vaping device 200) in the absence of the sensor apparatus 100.

Figure 3:
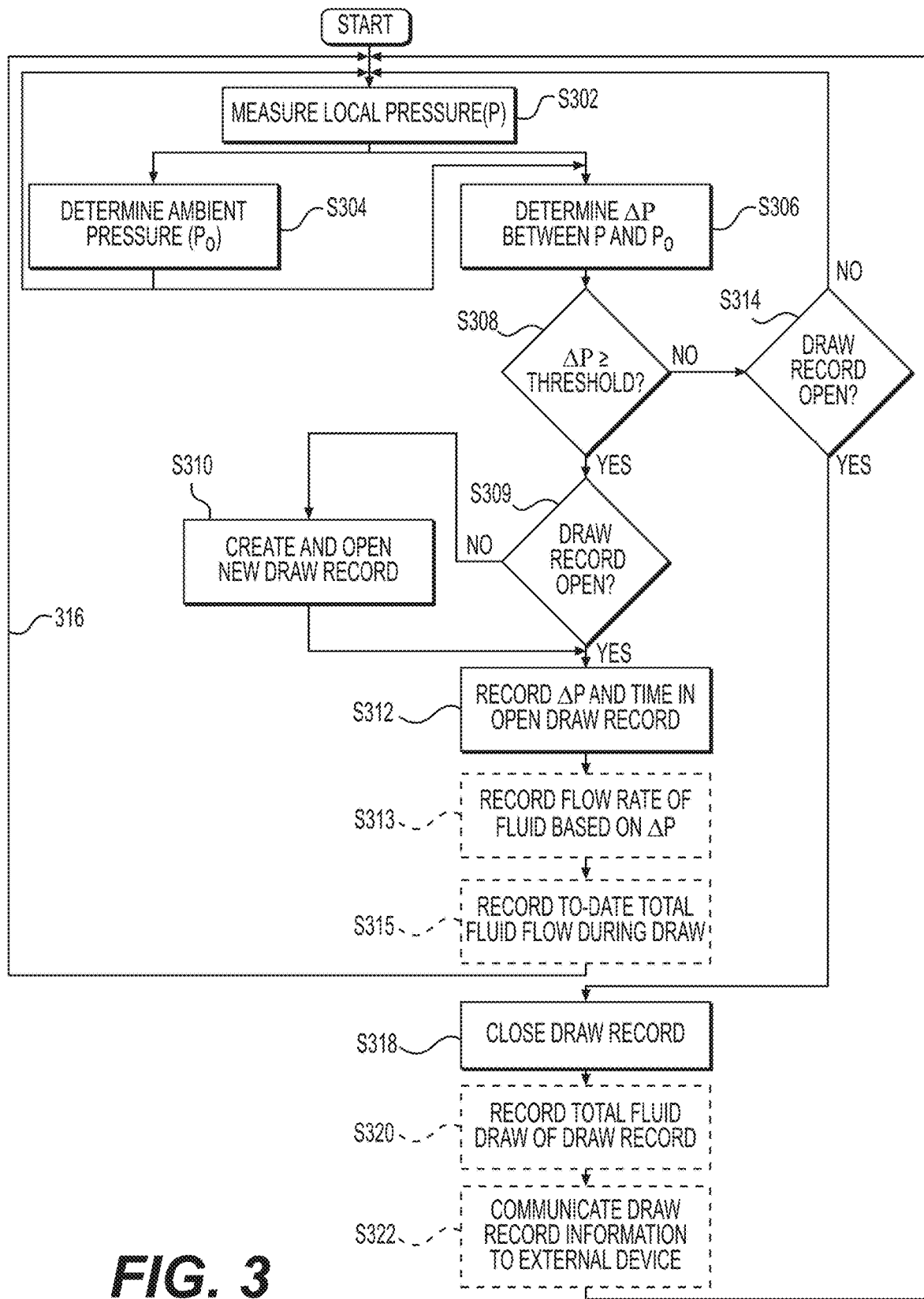
FIG. 3 is a flowchart illustrating operation of a sensor apparatus according to some example embodiments.

FIG. 3 is a flowchart illustrating operation of a sensor apparatus according to some example embodiments. The operation illustrated in FIG. 3 may be implemented, in whole or in part, by one or more portions of any embodiment of the sensor apparatus 100 as described herein. For example, the operation illustrated in FIG. 3 may be implemented based on the processor 174 included in the sensor apparatus 100 executing a program of instructions stored in a memory 176 of the sensor apparatus 100.

At S302, a local pressure ("P") is measured (e.g., the magnitude of the pressure at location 175 is measured) by a sensor device (e.g., sensor device 172) at a location (e.g., location 175) that is in hydrodynamic contact with a fluid conduit (e.g., fluid conduit 122) of a channel structure (e.g., channel structure 102-1) of a sensor apparatus (e.g., sensor apparatus 100). Based on the measurement of the local pressure, the sensor device may generate an instance of sensor data, wherein the instance of sensor data includes information indicating the value ("magnitude," "level," etc.) of the measured local pressure.

In some example embodiments, each given instance of sensor data generated by the sensor device may include, in addition to information indicating a given magnitude of the local pressure as measured by the sensor device in a given measurement, information indicating a timestamp associated with the given measurement (e.g., information indicating a point in time at which the given measurement was generated). Such information, referred to herein as "timestamp information" and/or "timestamp metadata," may be included in the given instance of sensor data. Each instance of sensor data that is generated by the sensor device may be stored in a memory (e.g., memory 176).

In some example embodiments, sensor data generated by the sensor device initially omits timestamp information, and the sensor data is transmitted from the sensor device to a processor (e.g., processor 174), wherein the processor adds timestamp information to the instance of sensor data, the timestamp information including a timestamp indicating a point in time at which the sensor data is received at the processor, and stores the modified instance of sensor data in a memory.

Sensor data may be stored in a memory device in the form of a database, wherein the various instances of sensor data stored in the database are arranged by at least the magnitude of measured local pressure of each instance of sensor data and/or the associated timestamp of each instance of sensor data. Thus, the stored instances of sensor data, also referred to herein as "historical sensor data," may be accessed and processed/analyzed based on timestamps and/or associated measured local pressure magnitudes of the historical sensor data. The database as described herein may comprise a look-up table (LUT).

At S304, an ambient pressure of an ambient environment external to the sensor apparatus ("$P_0$") is determined (e.g., the magnitude, value, etc. of the ambient pressure is determined) based on the processing of historical local pressure values ("P") measured by the sensor device over a period of time and stored as various instances of sensor data with associated timestamp information.

In some example embodiments, the magnitude of the ambient pressure is determined based on processing historical local pressure measurements to determine a measured local pressure magnitude that corresponds to a minimal and/or negligible flow rate of fluid through the fluid conduit. If and/or when the flow rate of fluid through the fluid conduit is at a minimal and/or negligible magnitude, the pressure drop from the ambient environment to the fluid conduit (e.g., the pressure differential) may be reduced and/or minimized, such that the magnitude of the local pressure at a location that is in hydrodynamic contact with the fluid conduit may match or substantially match (e.g., match within manufacturing tolerances and/or material tolerances and/or within normal variations of atmospheric pressure in an ambient environment) the magnitude of the actual ambient pressure in the ambient environment.

Accordingly, at S304, the determination of the ambient pressure based on processing historical measurements of the local pressure may include processing a selected set of historical local pressure measurements. The set of historical local pressure measurements may be represented by a set of historical sensor data stored in a memory, as described above. In some example embodiments, a "set" of historical sensor data includes instances of sensor data associated with timestamps (e.g., including timestamp information) that are within a particular range of time. The particular range of time may be a particular period of elapsed time preceding the present point in time, wherein the magnitude of the period of elapsed time may be a particular, fixed magnitude (e.g., 30 seconds, 1 minute, 5 minutes, 15 minutes, etc.).

As a result, in some example embodiments, the determination of the ambient pressure based on processing historical measurements of the local pressure may include accessing the database of historical sensor data to identify, within the database, a selection ("set") of historical sensor data associated with timestamps within the particular range of time.

The selection of historical sensor data may be processed to determine a magnitude of measured local pressure that is determined to correspond to minimal and/or negligible fluid flow through the fluid conduit. Such processing may include generating a distribution (e.g., a normalized distribution) of measured local pressure magnitudes of the selection of historical sensor data.

The processing may further include omitting, from the selection of historical sensor data, instances of sensor data that include measured local pressure magnitudes that are associated with a particular variation from the median measured local pressure magnitude of the distribution (e.g., one standard deviation, two standard deviations, etc.). Such omitting may enable the removal of measured local pressures that correspond to a non-negligible flow of fluid through the fluid conduit (e.g., when fluid is being drawn through the sensor apparatus), based on the assumption that, within any given sufficiently-extended period of elapsed time (e.g., at least 30 seconds of elapsed time), fluid flow through the fluid conduit is predominantly negligible and substantial draws of fluid through the fluid conduit are intermittent and of relatively short duration in comparison to the magnitude of the sufficiently-extended period of elapsed time.

Upon omission of sufficiently varying instances of sensor data from the selection of historical sensor data, the remaining (non-omitted) instances of historical sensor data from the selection may be processed to determine a value (magnitude, level, etc.) of the ambient pressure. The processing may include determining the ambient pressure value as an arithmetic mean of the measured local pressure values of the remaining instances of historical sensor data, determining the ambient pressure value as a median of the measured local pressure values of the remaining instances of historical sensor data, some combination thereof, or the like.

In some example embodiments, the ambient pressure determination performed in the operation at S304 may be repeated periodically, intermittently, continuously, in response to one or more triggering events, some combination thereof, or the like. For example, as shown in FIG. 3, in some example embodiments the ambient pressure value may be re-determined (e.g., "recalculated") in response to each new measurement of local pressure at S302. As a result, the determined ambient pressure value may be updated with each new local pressure measurement to maintain a relatively accurate ambient pressure value.

At S306, a pressure differential ("ΔP") is determined based on a determined difference between the local pressure value that is measured at S302 and the ambient pressure value that is measured at S304. As shown in FIG. 3, the operation at S306 may be based upon the local pressure value that is measured at S302 and the ambient pressure value that is measured at S304, in response to the measurement of the local pressure at S302. The pressure differential may be determined as a simple subtraction of the determined ambient pressure value from the measured local pressure value. The pressure differential may be determined as a simple subtraction of the measured local pressure value from the determined ambient pressure value.

At S308, a determination is made regarding whether the value (magnitude, level, etc.) of the pressure differential determined at S306 at least meets a particular threshold value (threshold level, threshold magnitude, etc.). Such a determination may be implemented to determine whether a variation in the measured local pressure from the determined ambient pressure is a result of normal ambient air pressure variation or the result of a draw of fluid through the fluid conduit. In some example embodiments, the value of the threshold is a particular, fixed value (e.g., a value between about 1 mm H2O and about 0.1 mm H2O). In some example embodiments, the value of the threshold is a proportion of the value of the determined ambient pressure, such that the value of the threshold may vary based on variation of the determined ambient pressure value (e.g., a threshold value that is up to 1% (e.g., 1% or less than 1%) of the magnitude of the determined ambient pressure). In some example embodiments, the value of the threshold is a design parameter that may be determined based on empirical study.

At S310, based on a determination that the pressure differential value at least meets the threshold value at S308, and a further determination, in the operation at S309, that a record of a fluid draw ("draw record") has not already been started (e.g., a draw record is not currently open), a determination is made that a draw of fluid through the fluid conduit has started. As a result, a new record of a fluid draw ("draw record") is created (e.g., "opened," "activated," etc.), and the timestamp associated with the measured local pressure at S302 may be recorded in the draw record as the "start time" of the particular fluid draw associated with the given opened draw record.

At S312, the pressure differential (determined at S306) is recorded and entered into the open draw record. Each recorded pressure differential in a draw record may be associated with the timestamp associated with the pressure differential (e.g., the timestamp associated with the local pressure, measured at S302, that is used to determine the pressure differential at S306). As a result, a given draw record may include a set of timestamps and associated pressure differential values.

At S313, the (mass and/or volume) flow rate of fluid through the fluid conduit in association with the timestamp of the pressure differential recorded at S312 may be determined. The flow rate may be determined via various methods (e.g., calculated, identified via use of one or more look-up tables), including the use of the equations presented earlier above.

For example, the determination of the flow rate may include the utilization of one or more constant values included in the one or more equations presented earlier above to calculate the flow rate. Such constant values may be stored in a memory and may be accessed and applied into an accessed equation, in addition to the application of the recorded pressure differential value to the one or more equations, to calculate the flow rate value.

In another example, a flow rate may be determined based on accessing a look-up-table that includes a set of pressure differential values and associated fluid flow rate values to identify the flow rate as a flow rate value that is associated in the look-up table with one or more particular input pressure differential values (e.g., the pressure differential value determined at S306). The look-up-table may be generated separately via well-known empirical techniques, for example via directing various instances of known flow rates of fluid through the fluid conduit and calculating the corresponding pressure differentials associated with the known flow rates of fluid.

If and/or when a flow rate value is determined at S313, the flow rate value may be recorded in the draw record such that the flow rate value is associated with the recorded pressure differential and/or the timestamp that is associated with the recorded pressure differential. As a result, a given draw record may include a set of timestamps and associated pressure differential values and/or associated fluid flow rate values.

At S315, a total amount of fluid (e.g., vapor) drawn through the fluid conduit during the given fluid draw represented by the draw record may be determined. For example, as the flow rate of fluid through the fluid conduit may be determined, at S313, at various points in time (represented by timestamps) during the fluid draw, the total amount of fluid associated with the fluid draw may be determined through various well-known techniques for determining (e.g., calculating and/or identifying via use of one or more look-up tables) total amounts of fluid that have flowed within a particular timestamp-marked period of elapsed time based on multiple time-stamped determinations of flow rate during that period of elapsed time.

Thus, a real-time or near-real-time indication of the "to-date" total amount of fluid associated with the given fluid draw is provided while the draw record is still "open" (e.g., while fluid is still being drawn through the fluid conduit).

One method for determining the total amount of fluid associated with the draw record may include curve-fitting a time-variable algorithm (e.g., a polynomial algorithm representing flow rate (e.g., y-axis value) with time as the variable (e.g., x-axis value)) to flow rate values and associated timestamp values recorded in the draw record and further calculating an integral of (and/or area underneath) the algorithm between the timestamp values associated with the start and stop of the vapor draw.

In another example, one method for determining the total amount of fluid associated with the draw record may include accessing a look-up-table that associates fluid flow rate values with total amounts of fluid for a given period of time associated with the associated fluid flow rate values. For example, where local pressures are measured (S302) and thus pressure differential values and/or flow rate values are recorded (S312, S313) periodically at a particular rate (e.g., a rate that is between about once every 0.01 seconds to about once every 0.2 seconds), the look-up table may associate each given fluid flow rate value in the table with a corresponding amount of fluid flow over the particular rate (e.g., an amount of fluid flow, at the associated fluid flow rate, over a period of 0.1 seconds). The look-up table may be generated empirically via well-known techniques (e.g., calculating a fluid amount associated with a flow rate through the fluid conduit for a given period of time, for a range of various flow rates). Fluid amounts can thus be determined for each timestamp of the draw record, and the total amount of fluid associated with the draw record can be calculated as a simple sum of the determined fluid amounts for the timestamps of the draw record.

As shown at the iteration loop 316 and S308, S309, and S314, the measuring of local pressures at S302, determination of ambient pressures at S304, determination of pressure differentials at S306, and recording of pressure differentials at S312 may continue iteratively from the timestamp at which the vapor draw is determined to start at (S309=NO, S310). The iterative operation may repeat at a periodic rate (e.g., operations S302-S313 are repeated at a rate that is between about once every 0.01 seconds to about once every 0.2 seconds).

The iterative operation may repeat until a determination is made, at S308, that the most recently determined pressure differential at S306 is less than the threshold value and a further determination is made, at S314, that a draw record is presently active, open, etc. If so (S308=NO, S314=YES), at S318, the fluid draw is determined to have ended at the timestamp associated with the most recently-measured local pressure at S302. Such a timestamp is recorded into the open draw record as the end timestamp associated with the recorded draw, and the draw record is "closed" such that additional timestamp-associated pressure differential and/or flow rate recordings are precluded from being added to the given draw record.

The closed draw record (also referred to herein as a "complete draw record") is thus considered to represent a record of an individual complete instance of fluid (which may include vapor and/or air) being drawn through the fluid conduit of the sensor apparatus from the external element. Each separate draw record may thus represent a separate, respective instance of fluid drawn through the fluid conduit from an external element. It will be understood that draw records may be opened, populated with recorded information, and closed sequentially, such that only one given draw record is open at a given point in time. Based on the operation at S315, a volume and/or mass of the instance of fluid may be determined and recorded in the draw record based on monitoring the variation in the pressure at the location over the period of time.

In some example embodiments, as shown at S320-S322, one or more additional determinations may be made with regard to a draw record. The results of such determinations may be entered into the draw record as instances of information associated with the given draw record.

For example, at S320, a total amount of fluid (e.g., vapor) drawn through the fluid conduit during the given fluid draw represented by the draw record may be determined. For example, as the flow rate of fluid through the fluid conduit may be determined, at S313, at various points in time (represented by timestamps) during the fluid draw, the total amount of fluid associated with the fluid draw may be determined through various well-known techniques for determining total amounts of fluid that have flowed within a particular timestamp-marked period of elapsed time based on multiple time-stamped determinations of flow rate during that period of elapsed time.

For example, one method for determining the total amount of fluid associated with the draw record may include curve-fitting a time-variable algorithm (e.g., a polynomial algorithm representing flow rate (e.g., y-axis value) with time as the variable (e.g., x-axis value)) to flow rate values and associated timestamp values recorded in the draw record and further calculating an integral of (and/or area underneath) the algorithm between the timestamp values associated with the start and stop of the vapor draw.

In another example, one method for determining the total amount of fluid associated with the draw record may include accessing a look-up-table that associates fluid flow rate values with total amounts of fluid for a given period of time associated with the associated fluid flow rate values. For example, where local pressures are measured (S802) and thus pressure differential values and/or flow rate values are recorded (S812, S313) periodically at a particular rate (e.g., a rate that is between about once every 0.01 seconds to about once every 0.2 seconds), the look-up table may associate each given fluid flow rate value in the table with a corresponding amount of fluid flow over the particular rate (e.g., an amount of fluid flow, at the associated fluid flow rate, over a period of 0.1 seconds). The look-up table may be generated empirically via well-known techniques (e.g., determining a fluid amount associated with a flow rate through the fluid conduit for a given period of time, for a range of various flow rates). Fluid amounts can thus be determined for each timestamp of the draw record, and the total amount of fluid associated with the draw record can be calculated as a simple sum of the determined fluid amounts for the timestamps of the draw record.

At S322, some or all of the information associated with a given draw record, including one or more closed draw records, may be communicated to an external device. In some example embodiments, information associated with a given "open draw record" may be communicated to an external device (e.g., concurrently and/or immediately subsequent to performing one or more of the operations shown at S312, S313, and or S315) to provide a real-time and/or near-real-time indication of the pressure differential, flow rate, and/or total amount of fluid "to-date" in the fluid conduit. Such communication may be considered a sensor data stream providing a real-time or near-real-time indication of at least one of a flow rate of a fluid (e.g., a mixture of generated vapor and external fluid) out of the external element, a pressure differential, a total to-date amount of fluid drawn through the flow conduit during a fluid draw, some combination thereof, or the like. As referred to herein, a fluid that includes a mixture of an external fluid (e.g., air) drawn into and through an external element and a vapor generated in the external element may itself be referred to as a "vapor" that is drawn out of the external element.

As noted above with reference to FIG. 2I, in some example embodiments, a sensor apparatus 100 includes multiple sensor devices that are collectively configured to generate sensor data indicating measured pressures of fluid in the fluid conduit 122 on opposite sides of an orifice structure 280. Therefore, in some example embodiments, at least operation S313 may be performed using well-known algorithms and techniques for determining flow rates of fluid drawn through the fluid conduit 122 based on fluid pressure measurements on opposite sides of an orifice structure 280 in the fluid conduit 122.

Figure 4A:
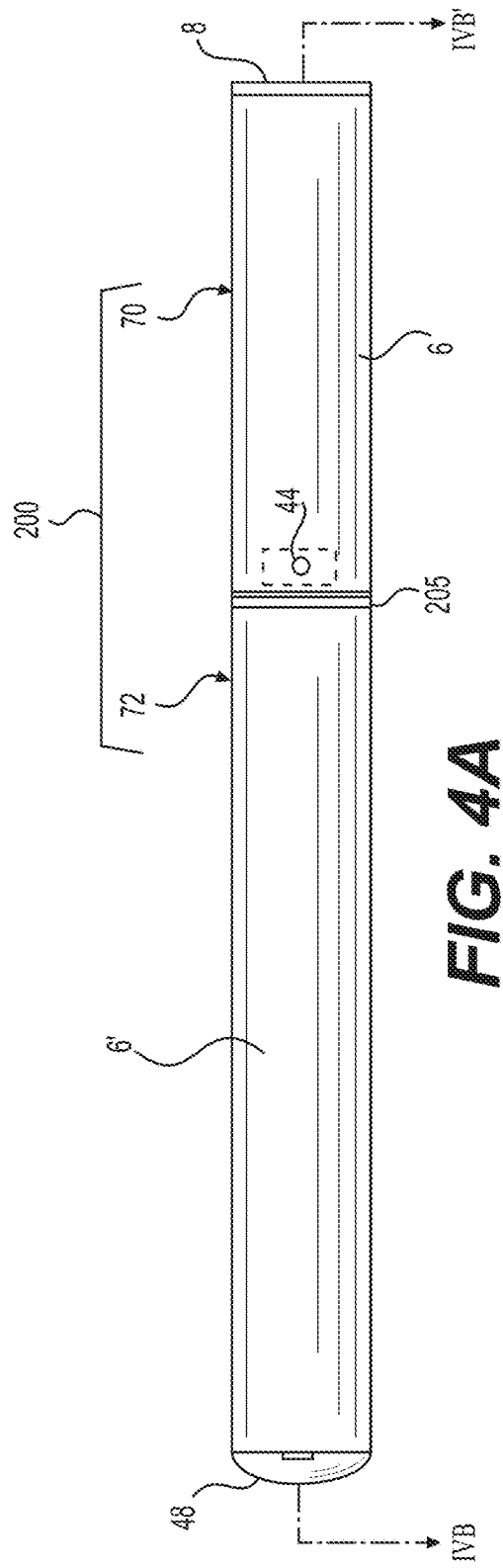
FIG. 4A is a side view of an e-vaping device according to some example embodiments.

FIG. 4A is a side view of an e-vaping device 200 according to some example embodiments. FIG. 4B is a cross-sectional view along line IVB-IVB' of the e-vaping device 200 of FIG. 4A. The e-vaping device shown in FIGS. 4A-4B may be any of the e-vaping devices 200 included in any of some example embodiments included herein.

In some example embodiments, as shown in FIG. 4A, an electronic vaping device (e-vaping device) 200 may include a replaceable "cartridge" (or first section) 70 and a reusable battery section (or second section) 72, which may be coupled together at a threaded connector 205. It should be appreciated that the connector 205 may be any type of connector, such as a snug-fit, detent, clamp, bayonet, and/or clasp, etc. The first section 70 may include a housing 6 and the second section 72 may include a second housing 6'. The e-vaping device 200 includes an outlet-end insert 8. The end (i.e., tip) of the housing 6 where the outlet-end insert 8 is positioned may be referred to as the "outlet-end" or "proximal-end" of the e-vaping device 200. The opposite ("distal") end of the e-vaping device 200 on the second housing 6' may be referred to as the "connection-end," "distal-end," "battery-end" or "front tip" of the e-vaping device 200. In some example embodiments, the housing 6 and the second housing 6' may have a generally cylindrical cross-section, but is not limited thereto. In other example embodiments, the housings 6, 6' may have a generally triangular cross-section along one or more of the first section 70 and the second section 72, etc.

Figure 4B:
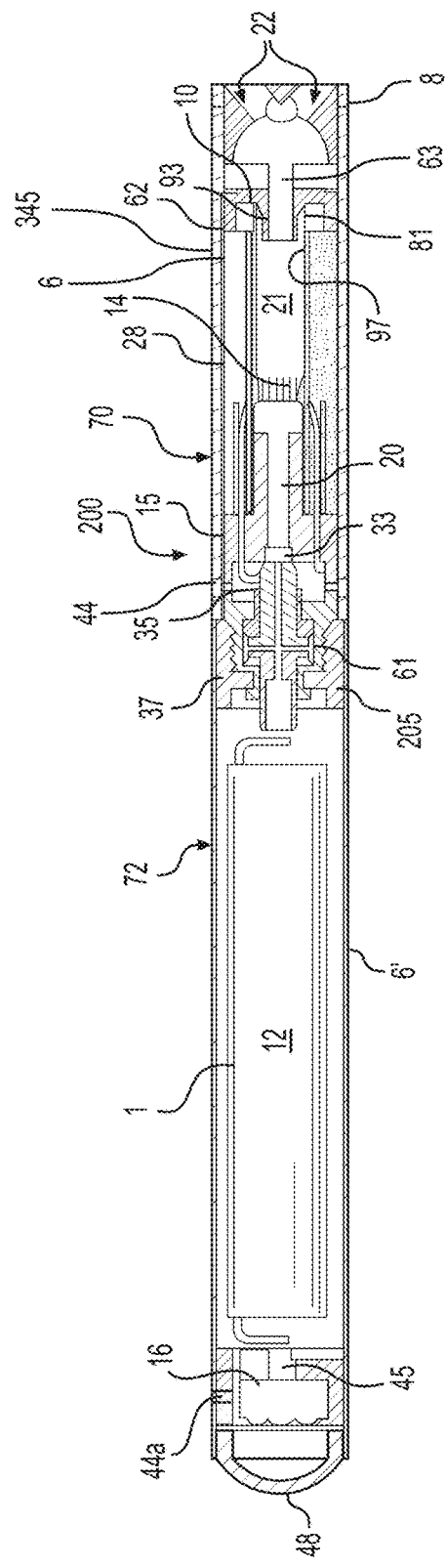
FIG. 4B is a cross-sectional view along line IVB-IVB' of the e-vaping device of FIG. 4A.

In some example embodiments, as shown in FIG. 4B, the first section 70 may include a reservoir 345 ("pre-vapor formulation reservoir") configured to contain a substance, such as a pre-vapor formulation, dry herbs, essential oils, etc., and a heater 14 (e.g., "heating element," "heater element," etc.) that may vaporize the substance, which may be drawn from the reservoir 345 by a wick 28. The e-vaping device 200 may include the features set forth in U.S. Patent Application Publication No. 2013/0192623 to Tucker et al. filed Jan. 31, 2013, the entire contents of which is incorporated herein by reference thereto. One or more of the wick 28 and the heater 14 may be referred to herein as a "vaporizer assembly."

In some example embodiments, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In some example embodiments, the first section 70 may include the housing 6 extending in a longitudinal direction and an inner tube (or chimney) 62 coaxially positioned within the housing 6.

At an upstream end portion of the inner tube 62, a nose portion 61 of a gasket (or seal) 15 may be fitted into the inner tube 62, while at the other end, an outer perimeter of the gasket 15 may provide a seal with an interior surface of the housing 6. The gasket 15 may also include a central, longitudinal air passage 20, which opens into an interior of the inner tube 62 that defines an inner passage 21. A transverse channel 33 at a backside portion of the gasket 15 may intersect and communicate with the air passage 20 of the gasket 15. This transverse channel 33 assures communication between the air passage 20 and a space 35 defined between the gasket 15 and a cathode connector piece 37.

In some example embodiments, the cathode connector piece 37 may include a threaded section for effecting the connection between the first section 70 and the second section 72. In some example embodiments, more than two inlets 44 may be included in the housing 6. Alternatively, a single inlet 44 may be included in the housing 6. Such arrangement allows for placement of the inlets 44 close to the connector 205 without occlusion by the presence of the cathode connector piece 37. This arrangement may also reinforce the area of inlets 44 to facilitate precise drilling of the inlets 44.

In some example embodiments, the inlets 44 may be provided in the connector 205 instead of in the housing 6.

In some example embodiments, air may be drawn into an interior of the e-vaping device 200 from an ambient environment (e.g., "ambient air") via one or more of the inlets 44. The air drawn into the e-vaping device 200 interior may be drawn through the e-vaping device 200 interior (e.g., through the inner passage 21) to one or more outlets 22 of the outlet-end insert, wherein the drawn air may be further drawn through the one or more outlets 22 and out of the e-vaping device 200.

In some example embodiments, the at least one inlet 44 may be formed in the housing 6, adjacent the connector 205 to minimize the chance of an adult vaper's fingers occluding one of the ports and to control the resistance-to-draw (RTD) during vaping. In some example embodiments, the inlets 44 may be machined into the housing 6 with precision tooling such that their diameters are closely controlled and replicated from one e-vaping device 200 to the next during manufacture.

In some example embodiments, a nose portion 93 of a downstream gasket 10 may be fitted into a downstream end portion 81 of the inner tube 62. An outer perimeter of the gasket 10 may provide a substantially tight seal with an interior surface 97 of the housing 6. The downstream gasket 10 may include a central channel 63 disposed between the inner passage 21 of the inner tube 62 and the interior of an outlet-end insert 8, which may transport the vapor from the inner passage 21 to the outlet-end insert 8 (e.g., "outlet structure") and through one or more outlets 22 (e.g., one or more "outlet conduits") in the outlet-end insert 8 so that the vapor is transported out of the e-vaping device 200.

During vaping, pre-vapor formulation, or the like, may be transferred from the reservoir 345 to the proximity of the heater 14 via capillary action of the wick 28. The wick 28 may include at least a first end portion and a second end portion, which may extend into opposite sides of the reservoir 345. The heater 14 may at least partially surround a central portion of the wick 28 such that when the heater 14 is activated, the pre-vapor formulation (or the like) in the central portion of the wick 28 may be vaporized by the heater 14 to form a vapor.

In some example embodiments, the heater 14 may include a wire coil which at least partially surrounds the wick 28. The wire may be a metal wire and/or the heater coil may extend fully or partially along the length of the wick 28. The heater coil may further extend fully or partially around the circumference of the wick 28. In some example embodiments, the heater coil may or may not be in contact with the wick 28.

In some example embodiments, the heater 14 may heat pre-vapor formulation (or the like) in the wick 28 by thermal conduction. Alternatively, heat from the heater 14 may be conducted to the pre-vapor formulation (or the like) by means of a heat conductive element or the heater 14 may transfer heat to the incoming ambient air that is drawn through the e-vaping device 200 during vaping, which in turn heats the pre-vapor formulation (or the like) by convection.

It should be appreciated that, instead of using a wick 28, the heater 14 may include a porous material which incorporates a resistance heater formed of a material having an electrical resistance capable of generating heat quickly.

In some example embodiments, as shown in FIG. 4B, the second section 72 of the e-vaping device 200 may include a sensor device 16 (e.g., a pressure sensor, a flow sensor, etc.) responsive to air drawn into the second section 72 via an inlet 44a adjacent a free end or tip of the e-vaping device 200. The second section 72 may also include a power supply 1.

Additionally, the second section 72 of the e-vaping device 200 may include a controller 45 and a battery monitoring unit (BMU) (not shown). In some example embodiments, the second section 72 may also include an external device input/output interface (not shown). The I/O interface may be a BLUETOOTH interface, for example.

The controller 45 includes a microprocessor, a non-transitory computer-readable storage medium, a heater control circuit, and/or a charge control circuit and may be connected to the sensor device 16.

The controller 45 performs features of the second section 72, as well as the entire e-vaping device 200, such as controlling the heater, interfacing with an external charger and monitoring the pressure within the e-vaping device 200 to determine whether an adult vaper has applied a negative pressure. Moreover, the controller 45 may determine whether an adult vaper has applied a positive pressure for a threshold time. In such an instance, the controller 45 may place the e-vaping device 200 in a disabled and or hibernation mode (reduced power consumption and/or preventing activation).

The controller 45 may be hardware, firmware, hardware executing software or any combination thereof. When the controller 45 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 45.

In the event where the controller 45 is at least one processor executing software (e.g., computer readable instructions), the controller 45 is configured as a special purpose machine to execute the software, stored in the non-transitory computer-readable storage medium, to perform the functions of the controller 45.

Upon completing the connection between the first section 70 and the second section 72, the power supply 1 may be electrically connectable with the heater 14 of the first section 70 upon actuation of the sensor device 16. Air is drawn primarily into the first section 70 through one or more air inlets 44, which may be located along the housing or at the connector 205.

The power supply 1 may include a battery 12 arranged in the e-vaping device 200. The power supply 1 may be a Lithium-ion battery or one of its variants, for example a Lithium-ion polymer battery. Alternatively, the power supply 1 may be a nickel-metal hydride battery, a nickel cadmium battery, a lithium-manganese battery, a lithium-cobalt battery or a fuel cell. The e-vaping device 200 may be usable by an adult vaper until the energy in the power supply 1 is depleted or in the case of lithium polymer battery, a minimum voltage cut-off level is achieved.

In some example embodiments, the power supply 1 may be rechargeable and may include circuitry configured to allow the battery to be chargeable by an external charging device. To recharge the e-vaping device 200, an USB charger or other suitable charger assembly may be used in connection with a charging interface (not shown). Additionally, a host interface (not shown) configured to communicate with an external computing device using wired and/or wireless communications may also be included in the housing of the power supply 1.

Furthermore, the sensor device 16 may be configured to sense an air pressure drop and initiate application of voltage from the power supply 1 to the heater 14. The sensor device 16 may also activate input/output (I/O) devices, such as a heater activation light 48 that is configured to glow when the heater 14 is activated. The heater activation light 48 may include a light-emitting diode (LED) and may be at an upstream end of the e-vaping device 200. Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. The heater activation light 48 may be on a tip end of the e-vaping device 200 or on a side of the housing 6.

In some example embodiments, the at least one air inlet 44a may be located adjacent the sensor device 16, such that the sensor device 16 may sense air flow indicative of an adult vaper taking a puff and activates the power supply 1 and the heater activation light 48 to indicate that the heater 14 is working. The heater activation light 48 may be located at and/or on the tip end of the e-vaping device. In other example embodiments, the heater activation light 48 may be located on a side portion of the housing 6.

In some example embodiments, the first section 70 may be replaceable. In other words, once the pre-vapor formulation, or other contents, of the cartridge is depleted, only the first section 70 may be replaced. An alternate arrangement may include some example embodiments where the entire e-vaping device 200 may be disposed once the reservoir 345 is depleted. Additionally, according to some example embodiments, the first section 70 may also be configured so that the contents of the cartridge may be re-fillable.

While FIGS. 4A and 4B depict example embodiments of an e-vaping device, the e-vaping device is not limited thereto, and may include additional and/or alternative hardware configurations that may be suitable for the purposes demonstrated. For example, the e-vaping device may include a plurality of additional or alternative elements, such as additional heating elements, reservoirs, batteries, etc. Additionally, while FIGS. 4A and 4B depict some example embodiments of the e-vaping device as being embodied in two separate housing elements, additional example embodiments may be directed towards an e-vaping device arranged in a single housing, and/or in more than two housing elements.

FIG. 5 is a schematic of a system configured to enable display and/or communication of topography information at one or more devices based on sensor data generated at one or more sensor apparatuses according to some example embodiments. As shown in FIG. 5, system 500 may include one or more assemblies 300, one or more computing devices 510, one or more networks 530, and one or more central server devices 520. The system 500 may further include one or more peripheral devices 540.

In some example embodiments, an assembly 300, including a sensor apparatus 100 and an external element 301 (e.g., an e-vaping device 200 as shown in FIG. 5), may be communicatively coupled to one or more external computing devices 510 via one or more communication links. As noted above with reference to FIGS. 1A-2H, a sensor apparatus 100 may include a communication interface 178 that may communicate information to (and may further receive information from) one or more external (e.g., remotely-located) devices. Such a communication interface 178 may establish one or more communication links with the one or more external devices such that at least a portion of the assembly 300 (e.g., at least the sensor apparatus 100) is communicatively coupled to the one or more external devices.

Such communication links may include a direct communication link and/or an indirect communication link. As shown in FIG. 5, for example, assembly 300 may be communicatively coupled to a computing device 510 via a direct communication link 503. A direct communication link 503 may include a wireless communication link and/or a wired communication link. A direct communication link 503 that is a wireless communication link may include an ad-hoc wireless network communication link (e.g., BLUETOOTH®) that the communication interface 178 of the sensor apparatus 100 may be configured to establish.

As further shown in FIG. 5, assembly 300 may be communicatively coupled to a communication network 530 via communication link 505, and one or more computing devices 510 may also be communicatively coupled to the same communication network 530 via one or more communication links 507, such that the assembly 300 may be communicatively coupled to one or more computing devices 510 via an indirect communication link 509 that extends through at least network 530 and one or more direct communication links (e.g., 505, 507) thereto.

In some example embodiments, a given assembly 300 in system 500 may be communicatively coupled, via one or more communication links, to one or more computing devices 510. In some example embodiments, a given computing device 510 may be communicatively coupled, via one or more communication links, to one or more assemblies 300.

In some example embodiments, a central server device 520, which may include one or more computing devices, is communicatively coupled to one or more computing devices 510 and/or assemblies 300 via network 530.

As shown in FIG. 5, in some example embodiments, a computing device 510 may include a display interface 514 (also referred to herein as a "display"). The display interface may display information in a graphical form, for example in a graphical user interface. The computing device 510 may also include a communication interface 513 that is configured to establish and/or maintain one or more communication links as shown in FIG. 5.

As also shown in FIG. 5, in some example embodiments, a computing device 510 may include a topography module 512 that is configured to generate, process, and/or maintain one or more instances of topography information based on information received from an assembly 300. The topography module 512 may utilize some or all of the topography information to generate one or more topography displays that may be presented in a graphical display on display interface 514. As described herein, the topography module 512 may be implemented by one or more instances of hardware comprising the computing device 510, including a processor of the computing device 510 that executes one or more programs of information stored on a memory of the computing device 510 to implement the topography module 512.

As described herein, topography information may include information indicating one or more patterns of fluid draws through one or more sensor apparatuses 100 of one or more assemblies 300. A pattern of fluid draws may include information indicating a historical record of fluid draws through the one or more assemblies 300. The pattern of fluid draws may comprise one or more draw records generated by the one or more sensor apparatuses 100 of the one or more assemblies 300.

The topography module 512 may receive one or more draw records from an assembly 300 and may generate, maintain, and/or update a topography record that is associated with one or more assemblies, adult vapers, or the like based on the received one or more draw records. The topography record may be referred to as at least partially comprising the aforementioned topography information.

A topography record that is generated by a topography module 512 may be stored locally at the computing device 510 of the topography module 512, communicated to one or more other computing devices 510, communicated to the central server device 520, some combination thereof, or the like. The topography record associated with one or more elements of a given assembly 300 (e.g., sensor apparatus 100 and/or external element 301) and/or adult vaper may be communicated from a computing device 510 to central server device 520 to communicate vapor draw patterns associated with one or more adult vapers, assemblies 300, sensor apparatuses 100, external elements 301, some combination thereof, or the like, to the central server device 520. Topography records may be communicated from multiple computing devices 510 to the central server device 520. As a result, the central server device 520 may receive topography records ('topography information") indicating vapor draw patterns associated with multiple various assemblies and/or multiple various adult vapers.

As shown in FIG. 5, a topography module 512 may maintain one or more topography accounts 570-1 to 570-N (N being a positive integer value), where each separate topography account 570-1 to 570-N is associated with a particular assembly 300, external element 301, sensor apparatus 100, computing device 510, adult vaper, some combination thereof, or the like. Each topography account 570-1 to 570-N includes a set of identification information 572 associated with the respective topography account. Identification information 572 may include identifying information that uniquely identifies an adult vaper associated with the given topography account 570-1 to 570-N, identifying information that uniquely identifies a particular sensor apparatus 100, identifying information that uniquely identifies a particular external element 301, etc.

In some example embodiments, topography module 712 may associate a particular instance of identification information 572 with a particular topography account 570-1 to 570-N based on receipt of same and/or based on adult vaper-initiated interaction with the computing device 410 comprising the topography module 412.

As further shown in FIG. 5, a topography account 570-1 to 570-N may further include one or more instances of draw records 574 associated with the topography account 570-1 to 570-N and may further include topography information that may be generated based on the one or more instances of draw records 574.

In some example embodiments, a topography module 512 may generate a topography account 570-1 to 570-N associated with a particular adult vaper supported by the computing device 510 of the topography module 512, such that the topography account 570-1 to 570-N includes identification information 572 that uniquely identifies the adult vaper.

The topography module 512 may associate a given communicatively-linked assembly 300 with the topography account 570-1 to 570-N based on associating one or more elements of the assembly (e.g., sensor apparatus 100) with the adult vaper identification information 572 included in the topography account 570-1 to 570-N. Such associating may be performed based on establishment of a communication link between the computing device 510 and the assembly 300, based on adult-vaper provided information provided to the computing device 510 that includes a command to associate a particular communicatively-linked assembly 300 with the adult vaper, some combination thereof, or the like. As a result, identification information 572 that uniquely identifies the assembly may be added to the topography account 570-1 to 570-N.

The topography module 512 may further generate, maintain, update, and/or store topography information 580 associated with the adult vaper in the topography account 570-1 to 570-N. Such topography information may include information associated with fluid draw patterns associated with the given communicatively-linked assembly 300 that is associated with the adult vaper entry. Such topography information 580 may be generated, updated, and/or maintained based on draw records 574 received from one or more assemblies associated with the topography account 570-1 to 570-N.

To generate, maintain, update, and/or store such topography information 580, the topography module 512 may receive draw records 574 from the assembly 300 and associate such received draw records 574 with one or more particular topography accounts 570-1 to 570-N. As noted above, such draw records 574 may include information associated with separate, discrete fluid draws at the assembly 300. In some example embodiments, information received from assembly 300 may be determined to be associated with the particular assembly 300 and/or one or more particular elements thereof (e.g., sensor apparatus 100, external element 301), for example based on a determination that the information is received via a particular communication link with a particular element of a particular assembly 300, based on identifying metadata included in the received information, some combination thereof, or the like.

The computing device 510 may store received draw records 574 in a topography record database. The topography module 512 may process the received one or more draw records 574 associated with a particular topography account 570-1 to 570-N to generate fluid draw pattern information that may be referred to herein as at least partially comprising topography information 580 associated with the particular topography account 570-1 to 570-N. Such processing may include processing the received draw records 574 associated with a particular topography account 570-1 to 570-N to generate information including one or more of a frequency of fluid draws over one or more periods of elapsed time (e.g., rolling 24-hr period, discrete days, discrete weeks, etc.), a total, mean, and/or median magnitude of fluid drawn through the assembly 300 per one or more particular fluid draw(s) and/or over a particular period of elapsed time, a determined pattern of fluid draws with regard to one or more of time of day, date, absolute geographic location, and/or relative geographic location in relation to one or more landmarks and/or other computing devices 510 and/or other assemblies 300, some combination thereof, or the like.

The topography module 512 may generate one or more graphical displays of the topography information 580 associated with a given topography account 570-1 to 570-N. The topography module 512 may cause such displays to be provided, via display interface 514, upon receipt of one or more control trigger commands (e.g., an adult vaper interaction with an interface of the computing device 510, a triggering event including the receipt of a draw record 574 from a particular assembly 300, some combination thereof, or the like). As noted below, the topography module 512 may generate other displays of information associated with the topography information 580, including marketing information, social networking information, or the like that may be specifically generated based on one or more instances of topography information generated at one or more computing devices 510.

In some example embodiments, a topography module 512 may receive real-time and/or near-real-time draw record 574 information from an assembly 300 during a fluid draw at the assembly 300. The topography module 512 may, based on processing such draw record 574 information and associating same with one or more particular topography accounts 570-1 to 570-N, generate a graphical display, provided via display interface 514, that provides a real-time and/or near-real-time display of draw record 574 information and/or topography information 580 associated with the assembly 300 and/or topography account 570-1 to 570-N associated with the assembly 300.

Still referring to FIG. 5, the central server device 520 may be configured to process and/or analyze topography information 580 received from one or more computing devices 510 to make decisions associated with one or more aspects associated with fluid draws in one or more of the assemblies 300. For example, a central server device 520 may, based on processing the received topography information 580 associated with one or more particular adult vapers, assemblies 300, external elements 301, and/or sensor apparatuses 100 (identified by identification information 572 that may be included in the topography information 580), determine an improved and/or optimized vapor generation control scheme (e.g., amount of vapor generated during a draw of fluid, rate of vapor generation during a draw of fluid, duration of vapor generation during a draw of fluid, etc.) via which an e-vaping device 200 of the assembly 300 associated with the particular topography account 570-1 to 570-N to generate vapor during a fluid draw at the assembly 300. The central server device 520 may communicate the control scheme to the assembly 300 to cause the e-vaping device 200 to generate vapor during a draw according to the new control scheme. The central server device 520 may communicate the control scheme to a computing device 510, such that the topography module 512 may communicate the new control scheme to the assembly 300 to cause the e-vaping device 200 to generate vapor during a draw according to the new control scheme.

In another example, a central server device 520 may, based on processing the received topography information 580 associated with one or more particular adult vapers, assemblies 300, external elements 301, and/or sensor apparatuses 100 (identified by identification information 572 that may be included in the topography information 580), determine a particular marketing scheme for marketing particular assembly-associated products (e.g., particular e-vaping devices, e-vaping device components such as particular cartridges, etc.) to particular adult vapers supported by particular assemblies 300. The central server device 520 may communicate the marketing information to one or more computing devices 510 communicatively linked to the one or more particular assemblies 300, and the one or more computing devices 510, via topography module 512, may generate/provide a graphical display of the marketing information via display interface 514.

In another example, a central server device 520 may, based on processing the received topography information associated with one or more particular adult vapers, assemblies 300, external elements 301, and/or sensor apparatuses 100 (identified by identification information 572 that may be included in the topography information 580), identify two or more particular adult vapers associated with similar fluid draw characteristics (e.g., amount of vapor generated per fluid draw, duration of fluid draws, frequency of fluid draws, time of day and/or geographic location of assembly 300 in association with fluid draws, etc.). The central server device 520 may communicate information to the computing devices 510 associated with the respective particular adult vapers, assemblies 300, external elements 301, and/or sensor apparatuses 100 (identified by identification information 572 that may be included in the topography information 580), such that the computing devices 510 associated with the respective particular adult vapers, assemblies 300, external elements 301, and/or sensor apparatuses 100 (identified by identification information 572 that may be included in the topography information 580) may generate displays indicating relative locations of the computing devices 510 to each other, thereby advancing a social networking feature.

As shown in FIG. 5, the system 500 may include one or more peripheral devices 540 that may be communicatively linked to the one or more computing device 510. In some example embodiments, a computing device 510 may generate an output (e.g., a display, information, some combination thereof, or the like) that is communicated to the peripheral device 540 to enable the peripheral device 540 to provide the output and/or generate and provide a new output based on the communicated output to an adult vaper supported by the computing device 510. In some example embodiments, the output may include an augmented reality/virtual reality ("AR/VR") display.

In some example embodiments, because the sensor apparatus 100 enables the generation of real-time and/or near-real-time draw records, where said draw records provide a relatively high level of accuracy of pressure differential and/or flow rate information of fluid through the sensor apparatus, such draw records can be used, by computing device(s) 510 alone or in combination with central server device 520 and/or peripheral device(s) 540, to generate real-time and/or near-real-time displays of information associated with fluid draws to an adult vaper supported by a computing device 510, assembly 300, and/or peripheral device 540, thereby enabling improved situational awareness by the adult vaper of parameters associated with individual fluid draws (e.g., fluid flow rate throughout a fluid draw, total amount of fluid throughout a fluid draw, etc.).

Additionally, because the sensor apparatus 100 enables the generation of draw records based on utilizing a relatively compact sensor apparatus structure that avoids including a sensor device that directly impinges and/or obstructs even a portion of the fluid conduit through which fluid is drawn, and further because the sensor apparatus 100 may utilize a wireless communication interface to communicate information associated with said draw records, the sensor apparatus 100 may enable the generation, monitoring, and/or analysis of improved-accuracy topography information that provide an improved indication of fluid draw properties that correspond to fluid draws through the external element (e.g., e-vaping device 200) in the absence of the sensor apparatus 100.

Figure 6:
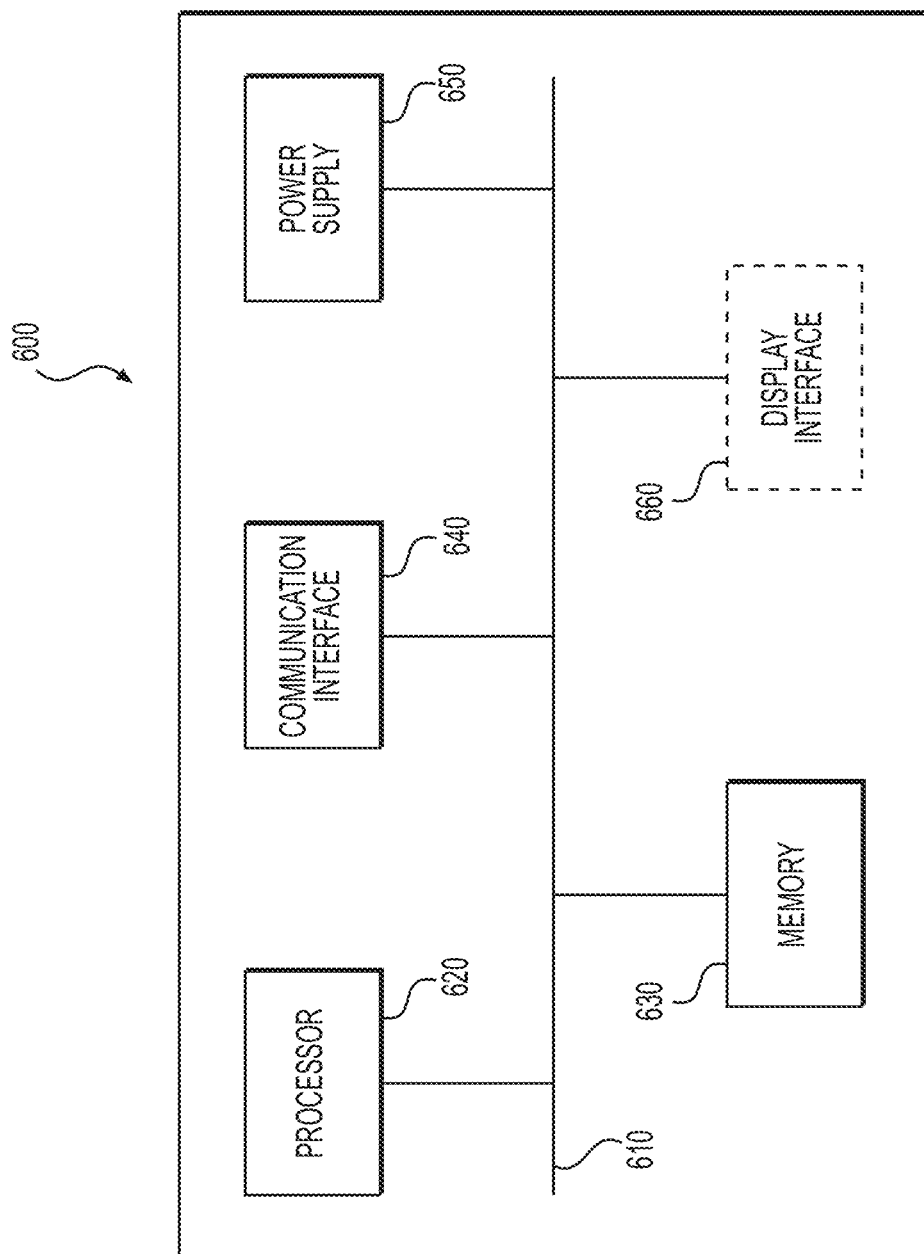
FIG. 6 is a flowchart illustrating operation of a computing device to generate topography information based on information received from a sensor apparatus according to some example embodiments.

FIG. 6 is a block diagram of an electronic device 600 according to some example embodiments. The electronic device 600 shown in FIG. 6 may include and/or be included in any of the electronic devices described herein, including the sensor apparatus 100, the e-vaping device 200, the computing device 510, the central server device 520, some combination thereof, or the like. In some example embodiments, some or all of the electronic device 600 may be configured to implement some or all of one or more of the electronic devices described herein.

Referring to FIG. 6, the electronic device 600 includes a processor 620, a memory 630, a communication interface 640, and a power supply 650. As further shown, in some example embodiments the electronic device 600 may further include a display interface.

In some example embodiments, the electronic device 600 may include a computing device. A computing device may include a personal computer (PC), a tablet computer, a laptop computer, a netbook, some combination thereof, or the like. The processor 620, the memory 630, the communication interface 640, the power supply 650, and the display interface 660 may communicate with one another through a bus 610.

The processor 620 may execute a program of instructions to control the at least a portion of the electronic device 600. The program of instructions to be executed by the processor 620 may be stored in the memory 630.

The processor 620 may be a central processing unit (CPU), a controller, or an application-specific integrated circuit (ASIC), that when executing a program of instructions stored in the memory 630, configures the processor 620 as a special purpose computer to perform the operations of one or more of the modules and/or devices described herein.

The processor 620 may execute a program of instructions to implement one or more portions of an electronic device 600. For example, the processor 620 may execute a program of instructions to implement one or more "modules" of the electronic device 600, including one or more of the "modules" described herein. In another example, the processor 620 may execute a program of instructions to cause the execution of one or more methods, functions, processes, etc. as described herein.

The memory 630 may store information. The memory 630 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The memory 630 may be a non-transitory computer readable storage medium.

The communication interface 640 may communicate data from an external device using various Internet protocols. The external device may include, for example, a computing device, a sensor apparatus, an AR/VR display, a server, a network communication device, some combination thereof, or the like. In some example embodiments, the communication interface 640 may include a USB and/or HDMI interface. In some example embodiments, the communication interface 640 may include a wireless network communication interface.

The power supply 650 may be configured to supply power to one or more of the elements of the electronic device 600 via the bus 610. The power supply 650 may include one or more electrical batteries. Such one or more electrical batteries may be rechargeable.

The display interface 660, where included in an electronic device 600, may include one or more graphical displays configured to provide a visual display of information. A display interface 660 may include a light-emitting diode (LED) and/or liquid crystal display (LCD) display screen. The display screen may include an interactive touchscreen display.

Figure 7:
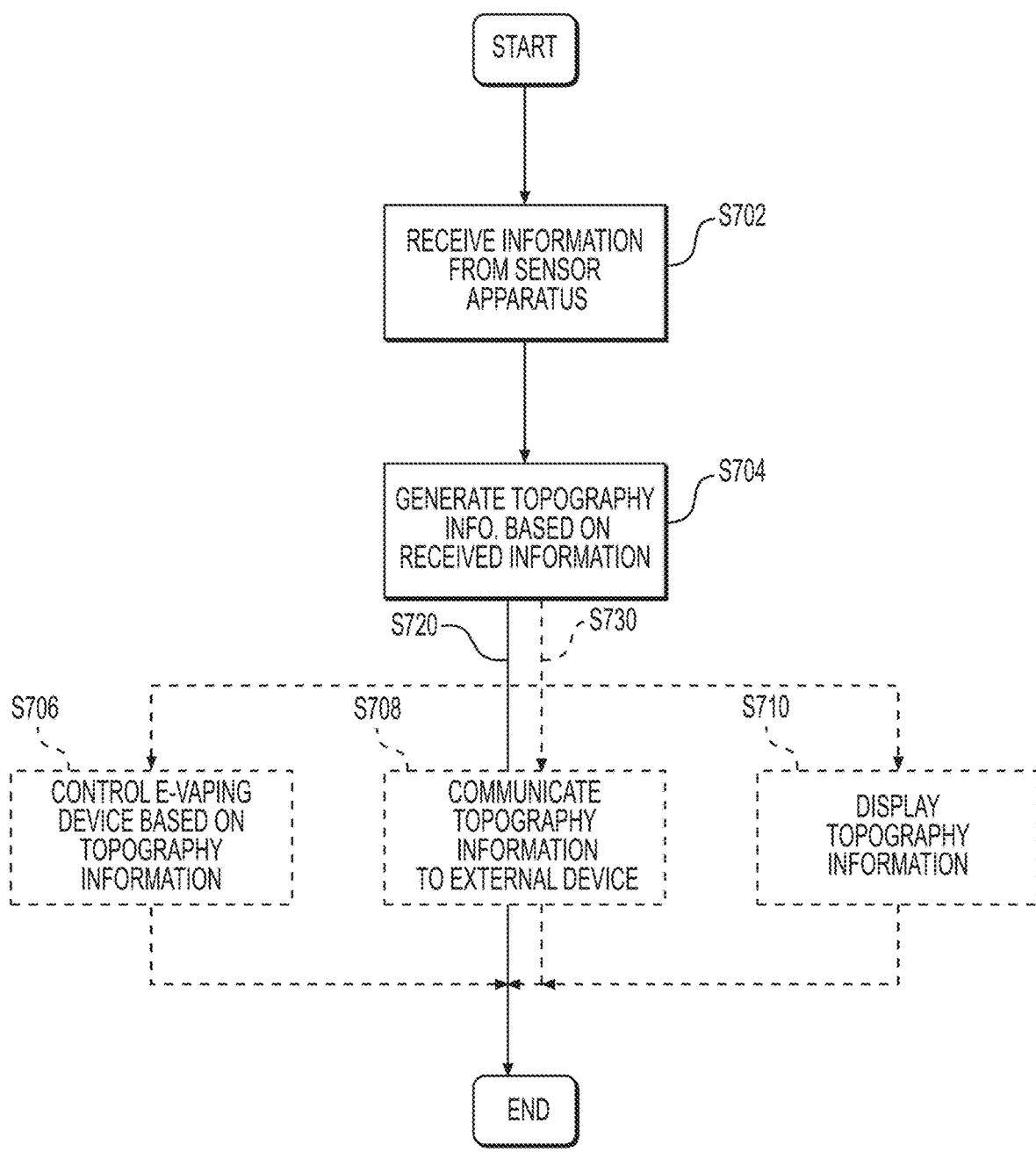
FIG. 7 is a block diagram of an electronic device according to some example embodiments.

FIG. 7 is a flowchart illustrating operation of a computing device to generate topography information based on information received from a sensor apparatus according to some example embodiments. The operation illustrated in FIG. 7 may be implemented, in whole or in part, by one or more portions of any embodiment of one or more computing devices 510, assemblies 300, and/or central server devices 520 as described herein. For example, the operation illustrated in FIG. 7 may be implemented based on a processor included in the computing device 510 executing a program of instructions stored in a memory of the computing device 510.

At S702, one or more instances of information are received from a sensor apparatus 100, where the one or more instances of information include information associated with one or more draw records. Such information may include information associated with one or more particular fluid draws and information identifying with one or more particular sensor apparatuses 100, external elements 301, adult vapers, some combination thereof, or the like.

For example, an instance of information received at S702 may include identification information that identifies the instance of information as being associated with one or more particular sensor apparatuses 100, e-vaping devices 200, and/or adult vapers. Such identification information may be used, as described further below, to associate one or more portions of the received instance of information with one or more particular topography accounts.

In some example embodiments, the receiving of one or more instances of information at S702 may include receiving information that is generated at one or more of a sensor apparatus 100 and an external element (e.g., an e-vaping device 200 that is coupled to the sensor apparatus 100).

At S704, some or all of the received information is processed to generate and/or update an instance of topography information based on the received information. Topography information may include information indicating one or more historical patterns associated with fluid draws recorded by one or more sensor apparatuses. For example, topography information generated at S704 may include information indicating, for a particular adult vaper, e-vaping device, and/or sensor apparatus, a pattern of fluid draws associated therewith.

A pattern of fluid draws included in an instance of topography information may include an indication of a frequency of fluid draws over a period of time, a variation in flow rate associated with the fluid draws, an amount of drawn fluid associated with the fluid draws, an amount of vapor associated with the fluid draws, one or more times of day and/or days of the week associated with the fluid draws, one or more geographic locations associated with the fluid draws, relative distance with a cumulative quantity of fluid draws over a period of time, a cumulative magnitude of fluid drawn over a period of time, some combination thereof, or the like. A pattern may be expressed, in some example embodiments, as a statistical distribution ("probability distribution") that may be discrete or continuous, normalized ("normal distribution," "Gaussian distribution," etc.), or the like. The topography information may include information associated with a pattern, including arithmetic mean value, median value, standard deviation, variance, or the like.

At S720, the operation shown in FIG. 7 may end upon generation of the topography information S704. Upon the operation ending, the generated topography information may be stored locally at a device implementing the operation shown in FIG. 7.

At S730, one or more additional operations S706-S710 may be performed.

At S706, the topography information may be used to control one or more operations of one or more external elements, including one or more e-vaping devices 200. Such control may include controlling an amount of vapor generated at the e-vaping device 200 in response to detecting a draw of fluid therethrough. Such control may include controlling a rate of heating of a heating element in the e-vaping device 200, controlling a threshold detected flow rate of fluid drawn through the e-vaping device 200 at which the heating element is activated, some combination thereof, or the like.

At S708, some or all of the topography information is communicated to an external device. Such an external device may be a computing device and/or peripheral device supporting an adult vaper, a central server device, some combination thereof, or the like. The topography information may be stored and/or processed at the external device for various uses.

At S710, a graphical display may be generated based on some or all of the topography information, and the generated graphical display may be presented ("displayed") via a display interface. The graphical display may include a graphical representation of some or all of the topography information. For example, where the topography information includes a pattern indicating a normalized probability distribution of an amount of fluid drawn through the sensor apparatus during a fluid draw, for a plurality of fluid draws recorded in a plurality of corresponding draw records, the graphical display may include a graphical representation of the normalized probability distribution and may further include graphical representations of associated information, including median value, variance, first and second standard deviations, some combination thereof, or the like.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A sensor apparatus, comprising:
a housing defining a channel structure including an inlet, an outlet, and an inner surface defining a fluid conduit extending from the inlet to the outlet through an interior of the channel structure, the fluid conduit not including a restriction in a diameter of the fluid conduit, the channel structure configured to couple with an external element, such that the channel structure is configured to receive a fluid drawn through the external element at the inlet, the fluid at least partially drawn through the external element from an ambient environment that is external to the fluid conduit, and direct the fluid through the fluid conduit; and
a single, individual sensor device in hydrodynamic contact with the fluid conduit and not restricting the fluid conduit, the single, individual sensor device configured to measure a local pressure at a single location that is in hydrodynamic contact with the fluid conduit at separate points in time over at least a period of time, wherein the housing defines
a cavity space within an interior of the sensor apparatus and separate from the fluid conduit, the single, individual sensor device located in the cavity space, and
a conduit extending between the fluid conduit and the cavity space, such that a portion of the cavity space proximate to the single, individual sensor device and separate from the fluid conduit is in hydrodynamic contact with at least at a portion of the fluid conduit that is proximate to an interface between the conduit and the fluid conduit.

2. The sensor apparatus of claim 1, wherein the sensor apparatus is configured to enable a flow rate of the fluid through the fluid conduit to be determined based on generating measurements indicating a variation in the local pressure, measured by the single, individual sensor device, that is induced based on the fluid flowing through the fluid conduit.

3. The sensor apparatus of claim 1, wherein the sensor apparatus is configured to enable a determination that an instance of fluid is passing through the channel structure, based on monitoring a variation in the local pressure, measured by the single, individual sensor device at the single location, over a particular period of time.

4. The sensor apparatus of claim 1, wherein
the external element is an e-vaping device configured to generate a vapor and direct the vapor through an outlet end of the e-vaping device, and
the inlet includes an interface configured to couple with the outlet end of the e-vaping device, such that
the interface establishes a substantially airtight seal between the inlet of the channel structure and the outlet end of the e-vaping device,
the channel structure is configured to receive the vapor at the inlet and direct the vapor through the fluid conduit to the outlet, and
the sensor apparatus is configured to enable a flow rate of the vapor to be determined based on generating measurements indicating variation in the local pressure, measured by the single, individual sensor device, that is induced based on air being drawn through the e-vaping device to the inlet of the channel structure from the ambient environment.

5. The sensor apparatus of claim 4, wherein the interface is configured to detachably couple with the outlet end of the e-vaping device.

6. The sensor apparatus of claim 5, wherein the channel structure is configured to induce a pressure drop, through the fluid conduit, that is substantially negligible in relation to a pressure drop at the inlet of the channel structure that is induced based on air being drawn through the e-vaping device.

7. The sensor apparatus of claim 1, wherein the sensor apparatus includes a wireless network communication transceiver, such that the sensor apparatus is configured to communicate data associated with the local pressure measured by the single, individual sensor device to a separately-located device via a wireless network communication link.

8. A system, comprising:
the sensor apparatus of claim 1; and
a computing device communicatively linked to the sensor apparatus via a wireless network communication link,
wherein the sensor apparatus is configured to communicate sensor data to the computing device via the wireless network communication link,
wherein the computing device is further configured to process the sensor data to generate topography information associated with the sensor apparatus.

9. A sensor apparatus, comprising:
a housing defining a channel structure including an inlet, an outlet, and an inner surface defining a fluid conduit extending from the inlet to the outlet through an interior of the channel structure, the fluid conduit not including a restriction in a diameter of the fluid conduit, the channel structure configured to couple with an external element, such that the channel structure is configured to receive a fluid drawn through the external element at the inlet, the fluid at least partially drawn through the external element from an ambient environment that is external to the fluid conduit, and direct the fluid through the fluid conduit; and
a single, individual sensor device in hydrodynamic contact with the fluid conduit and not restricting the fluid conduit, the single, individual sensor device configured to measure a local pressure at a single location that is in hydrodynamic contact with the fluid conduit at separate points in time over at least a period of time, wherein the single, individual sensor device is configured to
generate first measurements of a plurality of first values of the local pressure at the single location in hydrodynamic contact with the fluid conduit at separate points in time corresponding to negligible fluid flow through the fluid conduit, the plurality of first values indicating an ambient pressure $P_0$ of the ambient environment, and
generate a second measurement of a second value of the local pressure P at the single location in hydrodynamic contact with the fluid conduit at a particular point in time corresponding to a flow of the fluid through the fluid conduit, wherein the sensor apparatus is configured to generate the first measurements and the second measurement to enable a flow rate of the flow of the fluid through the fluid conduit at the particular point in time to be determined based on a pressure differential $\Delta P$ between the second value of the local pressure P and a determined value of the ambient pressure $P_0$.

10. The sensor apparatus of claim 9, wherein the sensor apparatus is configured to communicate a data stream providing a real-time indication of the pressure differential $\Delta P$ to a separately-located device via a wireless network communication link.

11. The sensor apparatus of claim 9, wherein the single, individual sensor device is incorporated into the inner surface defining the fluid conduit, such that a fluid conduit-proximate surface of the single, individual sensor device is substantially coplanar with the inner surface.

12. The sensor apparatus of claim 9, wherein
the external element is an e-vaping device configured to generate a vapor and direct the vapor through an outlet end of the e-vaping device, and
the inlet includes an interface configured to couple with the outlet end of the e-vaping device, such that
the interface establishes a substantially airtight seal between the inlet of the channel structure and the outlet end of the e-vaping device,
the channel structure is configured to receive the vapor at the inlet and direct the vapor through the fluid conduit to the outlet, and
the sensor apparatus is configured to enable the flow rate of the vapor to be determined based on generating measurements indicating variation in the local pressure, measured by the single, individual sensor device, that is induced based on air being drawn through the e-vaping device to the inlet of the channel structure from the ambient environment.

13. The sensor apparatus of claim 12, wherein the interface is configured to detachably couple with the outlet end of the e-vaping device.

14. The sensor apparatus of claim 13, wherein the channel structure is configured to induce a pressure drop, through the fluid conduit, that is substantially negligible in relation to a pressure drop at the inlet of the channel structure that is induced based on air being drawn through the e-vaping device.

15. The sensor apparatus of claim 9, wherein the sensor apparatus includes a wireless network communication transceiver, such that the sensor apparatus is configured to communicate data associated with the local pressure measured by the single, individual sensor device to a separately-located device via a wireless network communication link.

16. A system, comprising:
the sensor apparatus of claim 9; and
a computing device communicatively linked to the sensor apparatus via a wireless network communication link,
wherein the sensor apparatus is configured to communicate sensor data to the computing device via the wireless network communication link,
wherein the computing device is further configured to process the sensor data to generate topography information associated with the sensor apparatus.

* * * * *